United States Patent
Darnell

(10) Patent No.: US 12,154,062 B2
(45) Date of Patent: *Nov. 26, 2024

(54) SYSTEM AND METHOD FOR MONITORING LOGISTICAL LOCATIONS AND TRANSIT ENTITIES

(71) Applicant: FreightVerify, Inc., Ann Arbor, MI (US)

(72) Inventor: Lorne Darnell, South Lyon, MI (US)

(73) Assignee: FreightVerify, Inc., Ann Arbor, MI (US)

(*) Notice: Subject to any disclaimer, the term of this patent is extended or adjusted under 35 U.S.C. 154(b) by 594 days.

This patent is subject to a terminal disclaimer.

(21) Appl. No.: 17/525,153

(22) Filed: Nov. 12, 2021

(65) Prior Publication Data

US 2022/0076194 A1    Mar. 10, 2022

Related U.S. Application Data

(63) Continuation-in-part of application No. 16/722,683, filed on Dec. 20, 2019, now Pat. No. 11,176,629.

(60) Provisional application No. 62/783,533, filed on Dec. 21, 2018.

(51) Int. Cl.
    *G06Q 10/08*    (2024.01)
    *G06Q 10/083*   (2023.01)

(52) U.S. Cl.
    CPC .................. *G06Q 10/083* (2013.01)

(58) Field of Classification Search
    CPC .......................... G06Q 10/083; G06Q 10/08

USPC .......................................................... 345/629
See application file for complete search history.

(56) References Cited

U.S. PATENT DOCUMENTS

| | | | |
|---|---|---|---|
| 7,979,245 B1 | 7/2011 | Bourlatchkov et al. | |
| 9,182,764 B1 | 11/2015 | Kolhouse et al. | |
| 9,875,311 B2 | 1/2018 | Bowman et al. | |
| 2004/0210721 A1 | 10/2004 | Detjens et al. | |
| 2006/0020630 A1 | 1/2006 | Stager et al. | |
| 2006/0222156 A1 | 10/2006 | Smith et al. | |
| 2009/0080408 A1 | 3/2009 | Natoli et al. | |
| 2010/0030578 A1 | 2/2010 | Siddique et al. | |
| 2010/0111377 A1 | 5/2010 | Monroe | |
| 2010/0114617 A1 | 5/2010 | Bobbitt et al. | |
| 2011/0099207 A1* | 4/2011 | Brown ................ G06F 16/2465 707/E17.055 |
| 2012/0249328 A1 | 10/2012 | Xiong et al. | |
| 2013/0215116 A1 | 8/2013 | Siddique et al. | |
| 2013/0304646 A1 | 11/2013 | De Geer et al. | |
| 2015/0085999 A1 | 3/2015 | De Los Reyes et al. | |
| 2016/0063235 A1 | 3/2016 | Tussy et al. | |
| 2016/0073225 A1 | 3/2016 | Ganesalingam et al. | |

(Continued)

*Primary Examiner* — Javid A Amini
(74) *Attorney, Agent, or Firm* — Darrow Mustafa PC

(57) ABSTRACT

A system and method utilizing a canonical model for monitoring fixed entities, transit entities, and/or moveable objects include a circuit having one or more data collectors and a configuration database in communication with the circuit. The configuration database has a plurality of location asset designators ("LADs") and modal asset designators ("MADs"), and/or sensor asset designators ("SADs"). The circuit is configured to periodically receive information from the transit entities and update the MADs, SADs, and/or LADs of the canonical model. Location information regarding the LADs, MADs, and/or SADs may be provided in a word-based format, such as what3words.

31 Claims, 22 Drawing Sheets

(56) References Cited

U.S. PATENT DOCUMENTS

| | | |
|---|---|---|
| 2016/0104113 A1 | 4/2016 | Gorlin et al. |
| 2016/0210602 A1 | 7/2016 | Siddique et al. |
| 2017/0109764 A1* | 4/2017 | Tripathi .............. G06Q 10/067 |
| 2017/0343360 A1* | 11/2017 | Harikrishnan ......... G01C 21/28 |
| 2017/0344934 A1 | 11/2017 | Millhouse et al. |
| 2018/0027272 A1 | 1/2018 | Raj et al. |
| 2019/0012595 A1 | 1/2019 | Beser et al. |
| 2020/0058214 A1 | 2/2020 | Darnell Muppirala et al. |
| 2020/0078666 A1 | 3/2020 | Monsarrat et al. |
| 2020/0118223 A1 | 4/2020 | Singh et al. |
| 2020/0285457 A1 | 9/2020 | Meriac et al. |

* cited by examiner

| Facility | Lexicon | Description |
|---|---|---|
| Supplier | S | A facility that supplies parts and components to customer manufacturing facilities |
| Consolidation | C | A facility where product from multiple sources to received and consolidated for further shipment |
| Cross-dock | X | A facility where materials from an incoming semi-trailer truck or railroad car are loaded directly into outbound trucks, trailers, or rail cars, with little or no storage in between |
| Logistics Center | L | A facility typically located int the vacility of a Customer's manufacturing facility that provides value-added services such as line sequencing, sub-assembly, re-packing, etc. to support production at the plant |
| Yard | Y | Opens yards at or near the plant used for staging vehicles for rail shipment, staging loaded trailers for final delivery to plant, or used for temporary storage of excess vehicle inventory |
| Customer Plant | A | A Customer's manufacturing facility |
| Warehouse | W | A facility uses for storage of excess inventory of product |
| Distribution | D | A facility that receives product for distribution to Customer location (distribution/de-consolidation) |
| Border Crossing | B | Land borders between countries where goods are passed through Import Customs |
| Port | O | Ports for Ocean or Air |
| Processor | P | A facility or location where value added and other services are performed on product |
| Dealer | D | The end point for the shipments of assembled vehicles and service parts |
| Carrier Terminal | T | Carrier operated terminal facility |
| Rail Station | R | Rail stations or interchanges |

Location Asset Designation http://onboarding.freightverify.com — 600

Step 1: Click "Add Single Location" to enter a single location or click "Import Locations" so consume from an existing data source (.csv, .xls, ...)

+ Add Single Location — 602       + Import Locations — 604

| Code | Name | Address | City | State | Postal Code | Geofenced | LAD |
|------|------|---------|------|-------|-------------|-----------|-----|
| 22010 | GMVM Spring Hill | 100 Saturn Pky | Spring Hill | TN | 37174-2492 | ● | Edit |

606

Add/Edit Location Asset Designation http://onboarding.freightverify.com

Parts

Step 1: Confirm the complete name and address for this location — 610

| Location Name | Location Code | Country |
|---|---|---|
| Dayton ODC | 839094968 | United States |

Address 1: 30 Lau Parkway      Address 2:

| City | State | Postal Code |
|---|---|---|
| Clayton | Ohio | 45315-8777 |

Step 2: Select one of the following Location Asset Designations (LAD) — 612

☐ Supplier          ☐ Customer Plant    ☐ Yard              ☑ Consolidation     ☐ Cross-dock
☐ Logistics Center  ☐ Yard              ☐ Customer Plant    ☐ Customer Plant    ☐ Warehouse
☐ Yard                                  ☐ Customer Plant    ☐ Warehouse         ☐ Distribution
☐ Distribution                          ☐ Border Crossing   ☐ Port              ☐ Processor Step 3: You can request to rename this facility. — 614

Customer Shortname: ODC
Customer Translation: Origin Distribution Center

Step 4: Select one of the product types — 616

☑ Assembly Parts    ☐ Finished Vehicles    ☐ Aftermarket Parts

[Next] — 618

ODC
Origin Distribution Center

FIG. 7B

Exception View

Search Part #, VIN #, Route #, DUNS or CISCO Code — Search Everything ∨ — Search

All Active GM Shipments

Trailer Exceptions
- 19 Idle Trailer
- 8 Behind Schedule
- 17 Missed Pickup
- 7 Missed Dropoff

Rail Exceptions
- 19 Train Idle
- 8 Bad Order
- 6 In Hold 1,297 Total

My Watchlist

GM - Lansing Grand River Assembly
- 411 On time
- 4 Behind Schedule
- 7 Idle Trailer
- 4 Missed Pickup
- 4 Missed Dropoff 426 Total

Part # 10034802482
- 309 On time
- 2 Behind Schedule
- 2 Idle Trailer
- 6 Missed Pickup
- 8 Missed Dropoff 325 Total

Part # 10034802482 to GM - Warren Assembly
- 514 On time
- 13 Behind Schedule
- 13 Idle Trailer
- 7 Missed Pickup
- 12 Missed Dropoff 546 Total

My Recent Events

- Shipment 27223462 has been located within Detroit Assembly Plant
- Shipment 3453463534 has been idle for More Than 3 Hours
- Shipment 836534356 has been located within Detroit Assembly Plant
- Shipment 2723435346 has Missed Pickup from GM-Warren Assembly
- Shipment 2734623434 11 has Missed Dropoff from GM-Fort Wayne Assembly
- Shipment 57235900845 has been deemed behind schedule to GM- Lansing Grand River Assembly

FIG. 9

| Facility | Lexicon | Description |
|---|---|---|
| Receiving | R | Location where incoming materials and assets are received into a site-of-care |
| Storage | S | Locations where materials and assets are stored while waiting (dwelling) prior consumption or deployment to a point-of-use |
| Admissions | A | Locations where patients are admitted and registered at a site-of-care. Emergent (emergency) and elective (walk-in). |
| Examination | E | Rooms where patients are initially examined, and clinicians specify additional diagnostic and clinical needs. |
| Imaging | I | Rooms where imaging technologies are used to visualize & diagnose specific conditions. Examples: X-Ray, MRI, Ultrasound, etc. |
| Lab | L | Rooms where samples are collected and tested to identify specific causes of patient symptoms. |
| Anesthesia | A | Rooms where patients are placed in a state of controlled, temporary loss of sensation or awareness in preparation for an operation or procedure. |
| Operating Theater | O | Rooms where surgical operations and procedures are carried out in an aseptic environment. |
| Pharmacy | P | Rooms where work with pharmaceutical supplies in conducted, and medications are dispensed. |
| Patient Room | R | Rooms where patients are assigned to a bed for rest and recovery after an operation or procedure |
| Discharge | D | Areas and rooms where patients that no longer require inpatient care are processed before going home. |
| Facilities | F | Rooms and areas where hospital services are conducted (instrument cleaning, sterilization processes, etc.) Includes office spaces, common areas, and building maintenance rooms. |

FIG. 11

FIG. 12
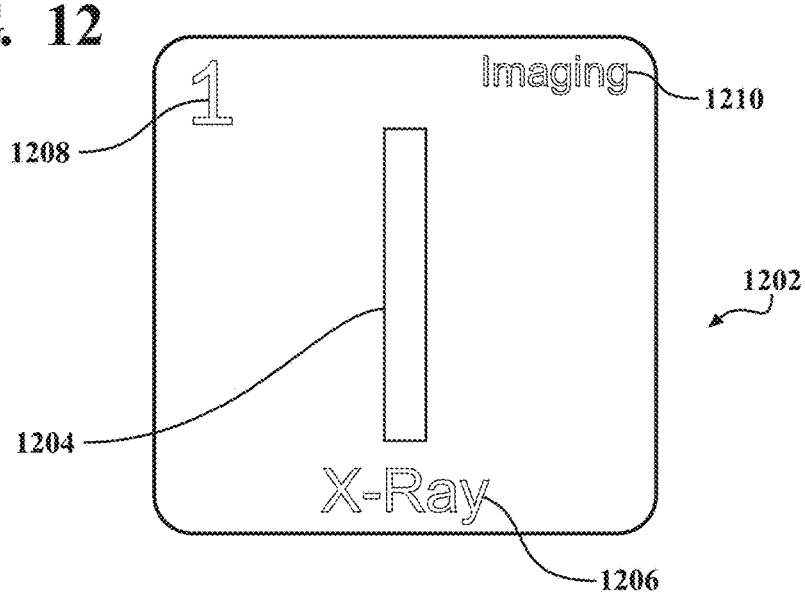
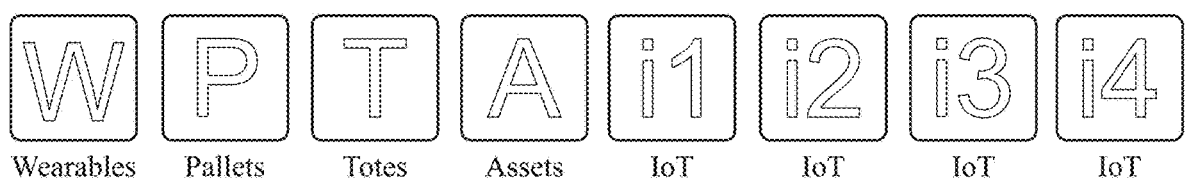
FIG. 13
FIG. 14
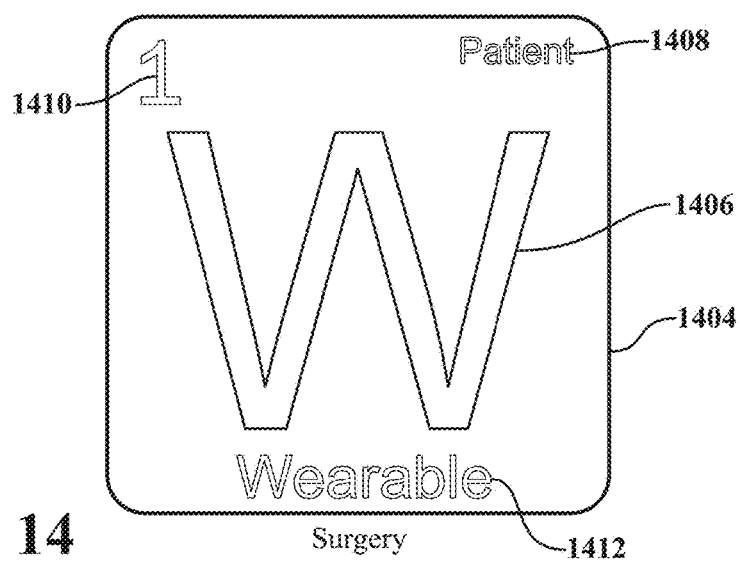

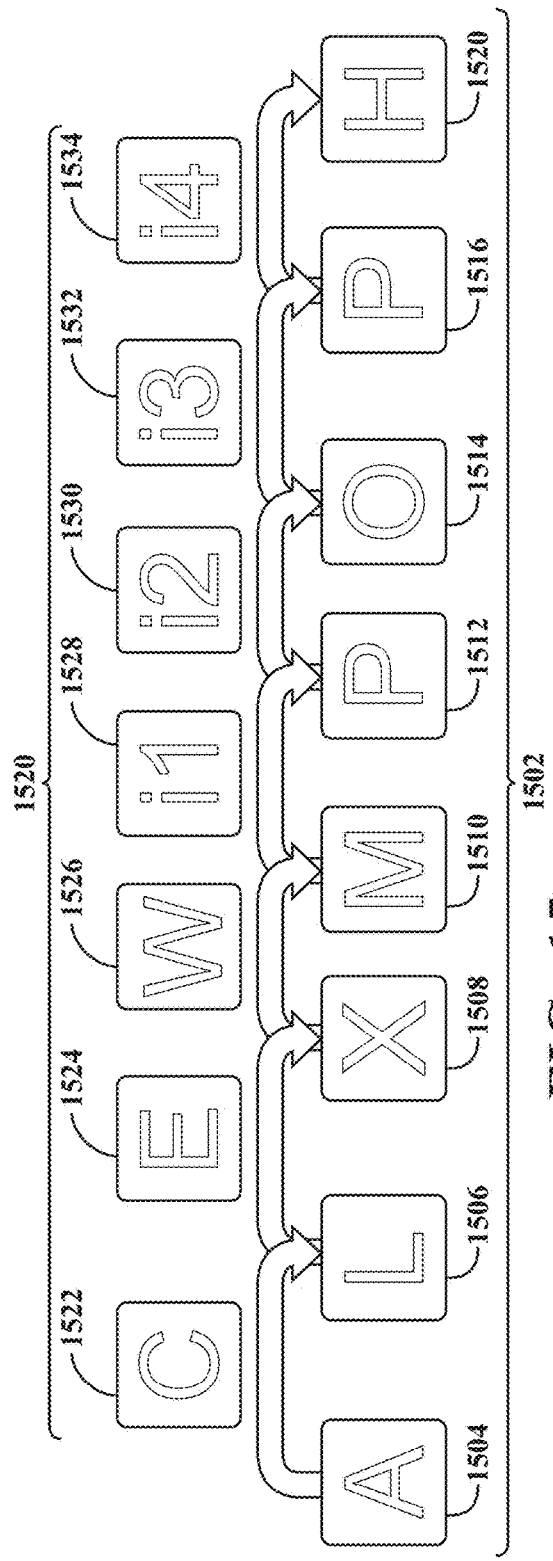
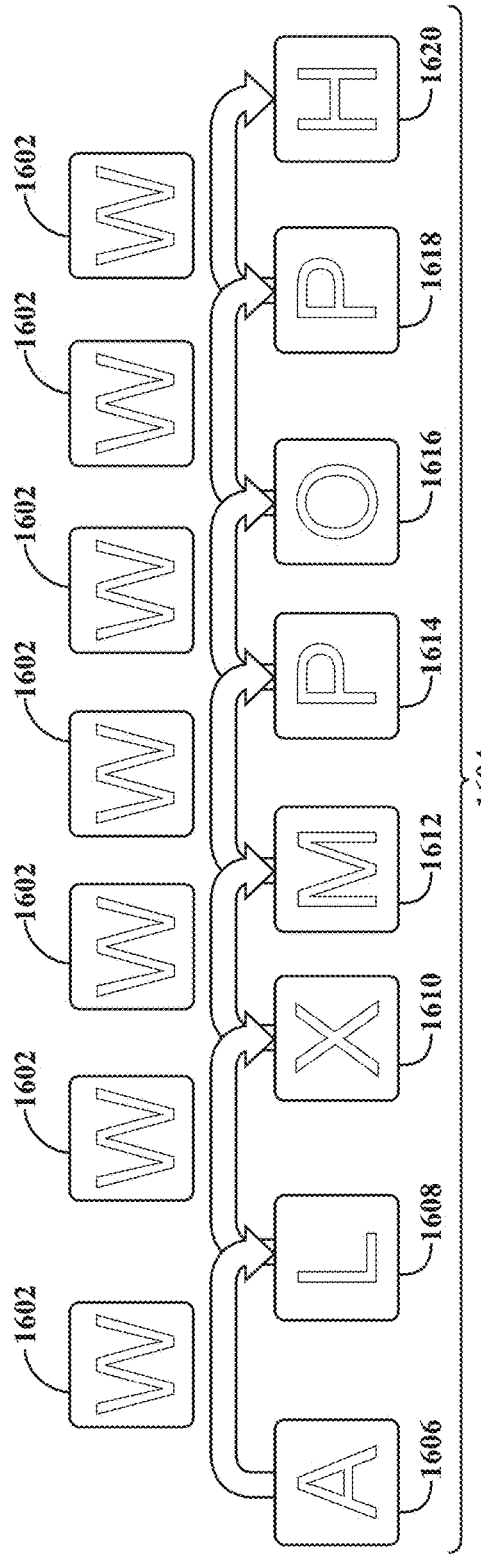

SYSTEM AND METHOD FOR MONITORING LOGISTICAL LOCATIONS AND TRANSIT ENTITIES

CROSS-REFERENCE TO RELATED APPLICATION

This application is a continuation-in-part of U.S. patent application Ser. No. 16/722,683 filed on Dec. 20, 2019, which claims priority to U.S. Provisional Patent Application 62/783,533 filed on Dec. 21, 2018, the entirety of both is herein incorporated by reference.

TECHNICAL FIELD

The subject matter described herein relates, in general, to systems and methods for monitoring and/or managing a supply chain.

BACKGROUND

The background description provided is to present the context of the specification generally. Work of the inventor, to the extent it may be described in this background section, and aspects of the description that may not otherwise qualify as prior art at the time of filing, are neither expressly nor impliedly admitted as prior art against the present technology.

Industrial supply chains and other types of supply chains, such as medical supply chains, are burdened with a highly fragmented logistics infrastructure. In the automotive manufacturing field, key service providers, such as carriers, warehouses, cross-docks, logistics companies, and information intermediaries maintain independent ecosystems with islands of information, making it extremely difficult for manufacturers to ensure reliable, on-time delivery and achieve optimal efficiencies. Throughout the extended supply chain, real-time transit visibility and transportation cost optimization may be non-existent.

As such, significant resources are devoted to handling the task of getting thousands of suppliers, truck, rail, ocean, and air carriers coordinated for multi-pick-up, multi-lane delivery to a single dock within a single plant for a specific just-in-time window. Compounding this problem, large supply chains, such as those used for the production and delivery of automobiles, generally involve upwards of dozens, if not hundreds, of manufacturing facilities, each having numerous docks, which must be coordinated simultaneously around the clock. As manufacturers repeat this routine for up to fifty or more assembly and component plants daily, one can appreciate the enormity and complexity of industrial-grade, inbound supply chains.

Several solutions to supervise and manage this simultaneous coordination of the supply chain have been implemented. The entities forming the supply chain must currently deploy numerous human resources to monitor and supervise these supply chains. Because each entity monitors only a portion of the supply chain, numerous third-party logistics management services may be employed utilizing multiple and fragmented, and redundant information systems. This type of system is not optimized, and one or more members must absorb supplier transportation costs to make up the supply chain.

Supply chains involving the medical industry, such as prompt delivery of medical items, as well as the prompt examination of patients, are equally Byzantine. Moreover, currently, there are very few systems that track the movement of medical items in patients throughout the hospital system, creating significant inefficiencies throughout the hospital system. These efficiencies result in medical items arriving late in patients being unattended to in an efficient manner.

SUMMARY

This section generally summarizes the specification and does not comprehensively explain its full scope or all its features.

In one embodiment, a system utilizes a canonical model for monitoring fixed entities, transit entities, and/or moveable objects includes a circuit having one or more data collectors and a configuration database in communication with the circuit. The configuration database has a plurality of location asset designators ("LADs") and modal asset designators ("MADs"), and/or sensor asset designators ("SADs"). The LADs each have a data structure that includes a type of fixed entity and a location of the fixed entity. The MADs each have a data structure that includes a transportation type for each of the transit entities. The SADs have a data structure that includes a sensor identity of a sensor associated with at least one of the moveable objects and a sensor location of the sensor. The circuit is configured to periodically receive information from the transit entities and update the MADs, SADs, and/or LADs of the canonical model.

Location information regarding the MADs, SADs, and/or LADs may be expressed and restored in a word-based format, such as what3words developed by what3words Limited of London, United Kingdom. A word-based format is generally easier for humans to understand and remember. Additionally, what3words is able to identify any 3-meter by 3-meter location on earth utilizing three words. As such, specific sub-location information associated with a LAD, such as gates, loading docks, parking, storage, and the like, can be utilized to identify the location of MADs, SADs, or other parts.

BRIEF DESCRIPTION OF THE DRAWINGS

The accompanying drawings, which are incorporated in and constitute a part of the specification, illustrate various systems, methods, and other embodiments of the specification. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 4A-4C illustrate the elements forming the canonical model;

FIGS. 6A-6C illustrate an example of the graphical user interface utilized to generate location asset designators;

FIGS. 7A and 7B illustrate a user interface illustrating the canonical model;

FIG. 9 illustrates a user interface that allows one to monitor all current shipments for a certain original equipment manufacturer;

FIG. 11 illustrates a variety of medical-related LADs;

FIG. 12 illustrates a more detailed example of a LAD for a hospital;

FIG. 13 illustrates several different SADs;

FIG. 14 illustrates a more detailed example of a SAD for a hospital;

FIG. 15 illustrates one example of different objects moving through different hospital locations;

FIG. 16 illustrates an example of the movement of a patient through different hospital locations;

DETAILED DESCRIPTION

Figure 1A:
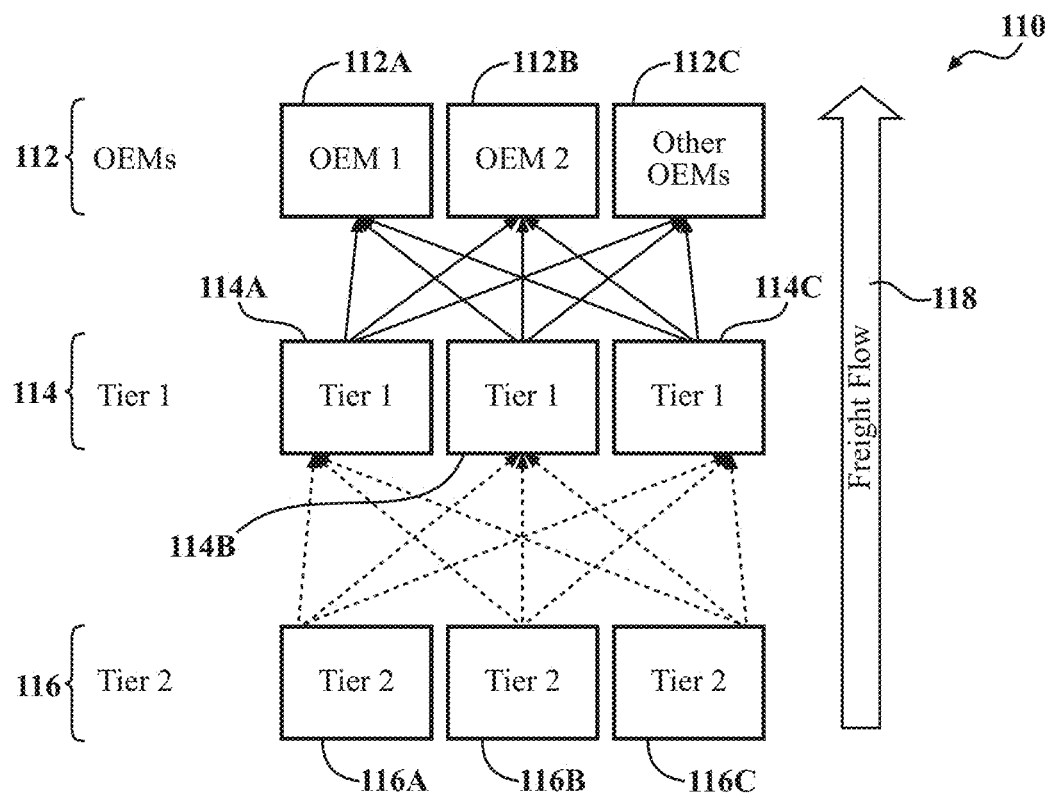
FIGS. 1A and 1B illustrate a prior art system illustrating the current issues with monitoring and managing an industrial supply chain.

Referring to FIG. 1A, a prior art system illustrating the current problem with the management of logistical operations of the supply chain is shown. Here, the logistical operation 110 includes three sets of entities. The original equipment manufacturers ("OEMs") 112 are illustrated as OEM 112A, OEM 112B, and OEM 112C. These OEMs are generally considered the final line in the manufacturing process of a finished good. So, using the automotive industry as an example, these OEMs could be OEMs such as General Motors, Ford Motor, Fiat Chrysler, and the like.

The OEMs 112 receive parts from one or more Tier-1 suppliers 114. Here, three Tier-1 suppliers 114A, 114B, and 114C, are shown. It should be understood that, especially in the automotive industry, there can be dozens if not hundreds of Tier-1 suppliers, each supplying the same or even different components to multiple OEMs 112.

Below the Tier-1 suppliers 114 are the Tier-2 suppliers 116, which include Tier-2 suppliers 116A, 116B, and 116C. Of course, it should be understood that the number of Tier-2 suppliers are very numerous and could include in the hundreds or even thousands. These Tier-2 suppliers provide parts to the Tier-1 suppliers 114, which in turn take these parts from the Tier-2 suppliers and provide vehicle subsystems that are provided to the OEMs 112. Thereafter, the OEMs put all of the subsystems together into a finished product, such as an automobile. As such, the freight flow 118 shown by an arrow originates with the Tier-2 suppliers 116 and then proceeds to the Tier-1 suppliers 114 and finally to the OEMs 112.

Additionally, it should be understood that while only Tier-1 suppliers 114 and Tier-2 suppliers 116 are shown, there can be multiple tiers of suppliers, such as a Tier-3 supplier, which supplies parts to the Tier-2 suppliers.

As can be seen in FIG. 1A, each of the Tier-2 suppliers 116A, 116B, and 116C may provide parts to one or more of the Tier-1 suppliers 114A, 114B, and 114C. Each of the Tier-1 suppliers 114 may supply one or more of the OEMs 112A, 112B, and 112C. As such, there is a significant web of shipping of different parts from different suppliers to other suppliers and from other suppliers to other OEMs. This is an extremely complicated process.

Compounding this complication is that most OEMs 112. Tier-1 suppliers 114, and Tier-2 suppliers 116 are usually required to practice just-in-time delivery. Just-in-time manufacturing is a methodology aimed primarily at reducing times within the production system as well as response times from suppliers and to customers. As such, parts delivered between each of these levels must be delivered in a timely fashion at a specified location. When parts fail to arrive at the appropriate location and in the appropriate time window, the manufacturing of products by either the OEMs 112, the Tier-1 suppliers 114, and/or the Tier-2 suppliers 116 is impacted. This impact follows up the freight flow 118, impacting each and every level of the supply chain.

As such, the management of these supply chains is incredibly critical to the OEMs 112 so that parts are delivered in a timely matter, can be manufactured efficiently, and then outputted from the OEMs to retailers. A breakdown in the supply chain causes significant problems and results in inefficiencies that culminate and reduce profits or even losses within the supply chain.

Figure 1B:
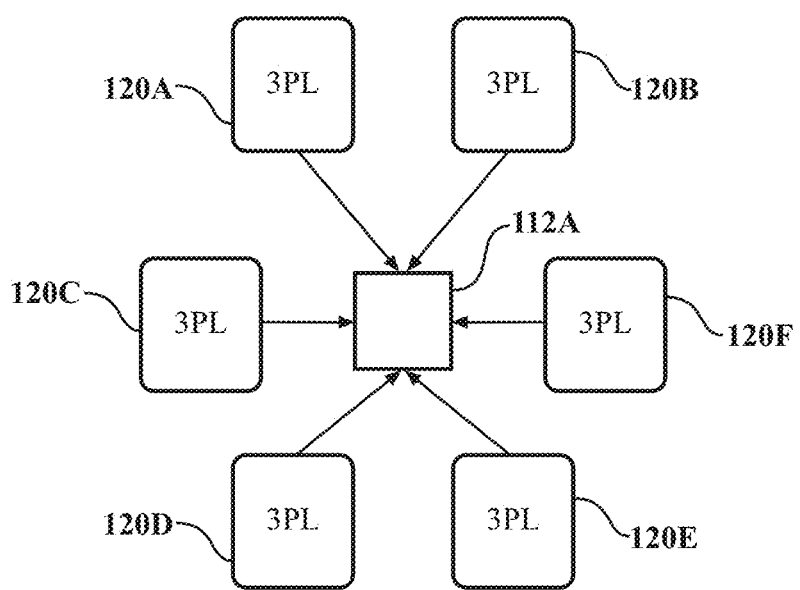

Referring to FIG. 1B, a prior art explanation of the management of the supply chain is shown. Here, the OEM 112A is General Motors. However, it should be understood that any OEM could be utilized. The OEM 112A pulls in data from third parties 120A-120F. In this case, the OEM 112A typically has its own system for managing the supply chain. However, in the case of another OEM, such as Ford Motor or Stellantis, each of those organizations has different ways of managing its supply chain. As such, there is significant confusion and overlap in inefficiencies required in executing each different OEMs management style of the supply chain. This puts significant pressure on the OEM to devote significant human resources to monitoring the supply chain but also puts significant resources on third parties 120A-120F to comply with the standard set by the OEM 112A. Compounding this is that different OEMs have different requirements, so each of the third parties 120A-120F must be able to comply with all of those different requirements from different OEMs. As such, this has caused significant increases in the transaction cost in doing business in the supply chain.

Figure 2A:
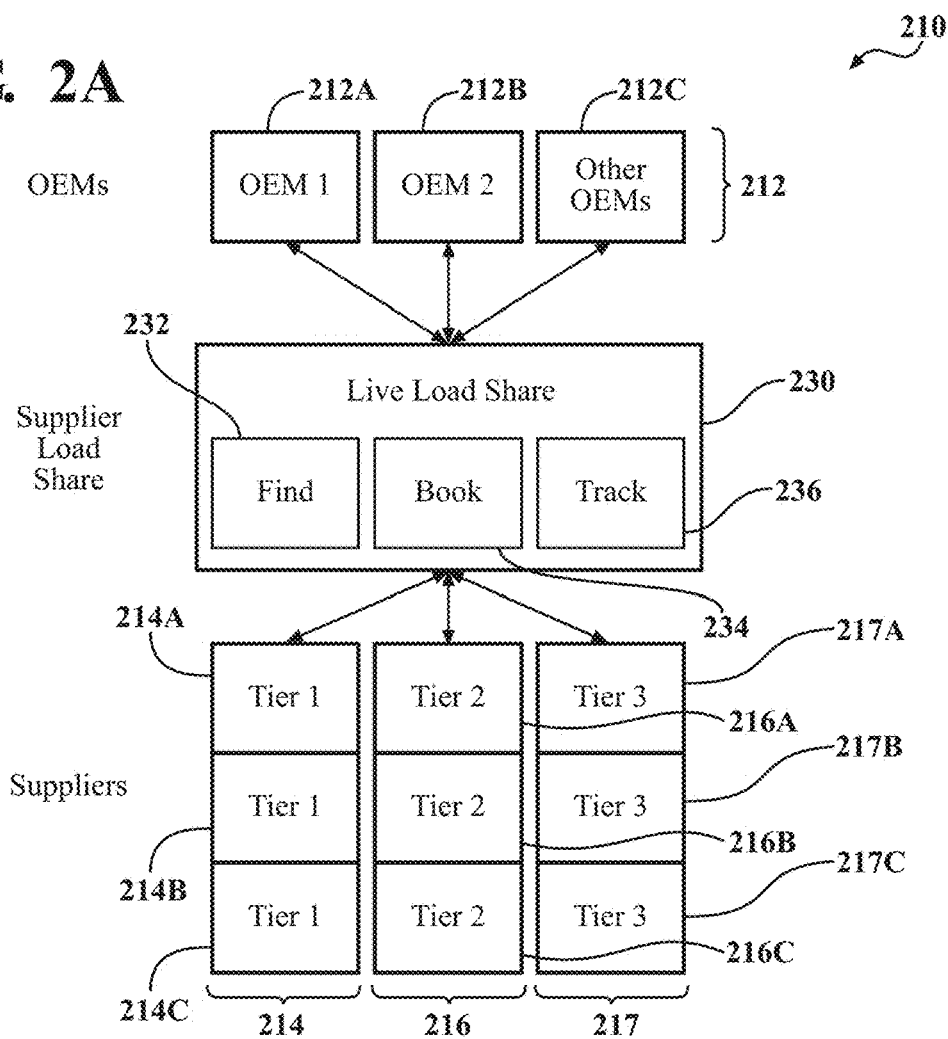
FIGS. 2A and 2B illustrate a high-level explanation of the claimed invention.

Referring to FIG. 2A, a high-level explanation of one example of the solution is shown. Here, the supply chain 210 utilizes a canonical model. A canonical model (sometimes called a canonical data model) is a design pattern used to communicate different data formats. It could be in the form of an enterprise application integration, and it is intended to reduce cost and standardize on agreed data definitions associated with integrating business systems.

Canonical data models are a type of data model that aims to present data entities and relationships in the simplest possible form in order to integrate processes across various systems and databases, as well as organizations. More often than not, the data exchanged across various systems and/or organizations rely on different languages, syntax, and protocols. The purpose of a canonical data model is to enable an enterprise to create and distribute a common definition of its entire data unit. This allows for smoother integration between systems, which can improve processes and also makes data mining easier.

A canonical data model may not merge all data models. Instead, it is a new way to model data that is different from the connected systems. This model must be able to contain and translate other types of data. For instance, when one system needs to send data to another system, it first translates its data into the standard syntax (a canonical format or a common format) that is not the same syntax or protocol of the other system. When the second system receives data from the first system, it translates that canonical format into its own data format.

A canonical data model approach can and should include any technology the enterprise uses, including ESB (enterprise service bus) and BPM (business performance/process management) platforms, other SOAs (service-oriented architecture), and any range of more specific tools and applications. In its most extreme form, a canon approach would mean having one person, customer, order, product, etc., with a set of IDs, attributes, and associations that the entire enterprise can agree upon. More details regarding the canonical model, as well as the elements that make up the canonical model, will be described later in this application.

As was explained in the description of FIGS. 1A and 1B, because of the complications of having numerous OEMs, numerous Tier-1, Tier-2, and even Tier-3 suppliers, there is a significant difficulty with tracking freight between all of these different entities. The canonical model that will be described in this specification provides a solution for simplifying the monitoring of the industrial supply chain.

In the simplest form, a supply chain utilizing the canonical model is shown as supply chain 210. Here, the OEMs 212 communicate with a system 230 that implements the canonical model. The system 230 has numerous functionalities and allows the OEMs 212 to find 232 elements of the canonical model, book 234 one or more transit entities, and data generated in the canonical model, and track 236 the elements making up the canonical model.

Data may be inputted into the canonical model from both the OEMs 212 as well as the Tier-1 suppliers 214, Tier-2 suppliers 216, and Tier-3 suppliers 217. As stated before, while only three tiers of suppliers are shown in this example, it should be understood that there may be more tiers of suppliers or, in fact, fewer tiers of suppliers. In either situation, data is provided from both the OEMs 212 as well as the suppliers 214, 216, and 217 into the system 230.

Figure 2B:
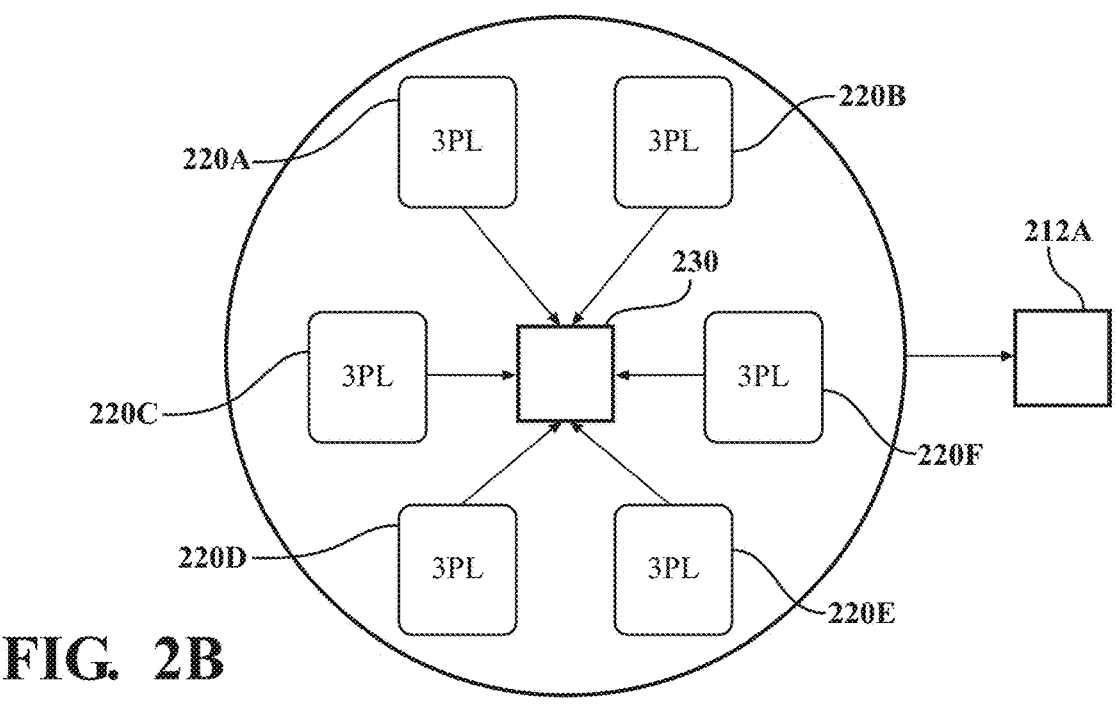

Referring to FIG. 2B, third-party partners 230A-220F provide information to the system 230. This information can then be provided to the OEM 212, which, in this case, is General Motors. Essentially, the system 230 is able to interact with many business partners, utilizing many internal tools but acts as a single integrated data source. As such, inbound production parts, outbound vehicles, aftermarket supply chains, and import and export movements can all be tracked by the system 230 and provided to the OEM 212A. From there, the OEM can do a number of different things, such as finding different facilities that receive or send production parts and tracking different transit entities that travel between the facilities. Furthermore, the system 230 can generate data regarding the movement of these parts by the transit entities between the different facilities. This data can include such things as travel time, dwell time, and a number of different additional useful data.

Figure 3:
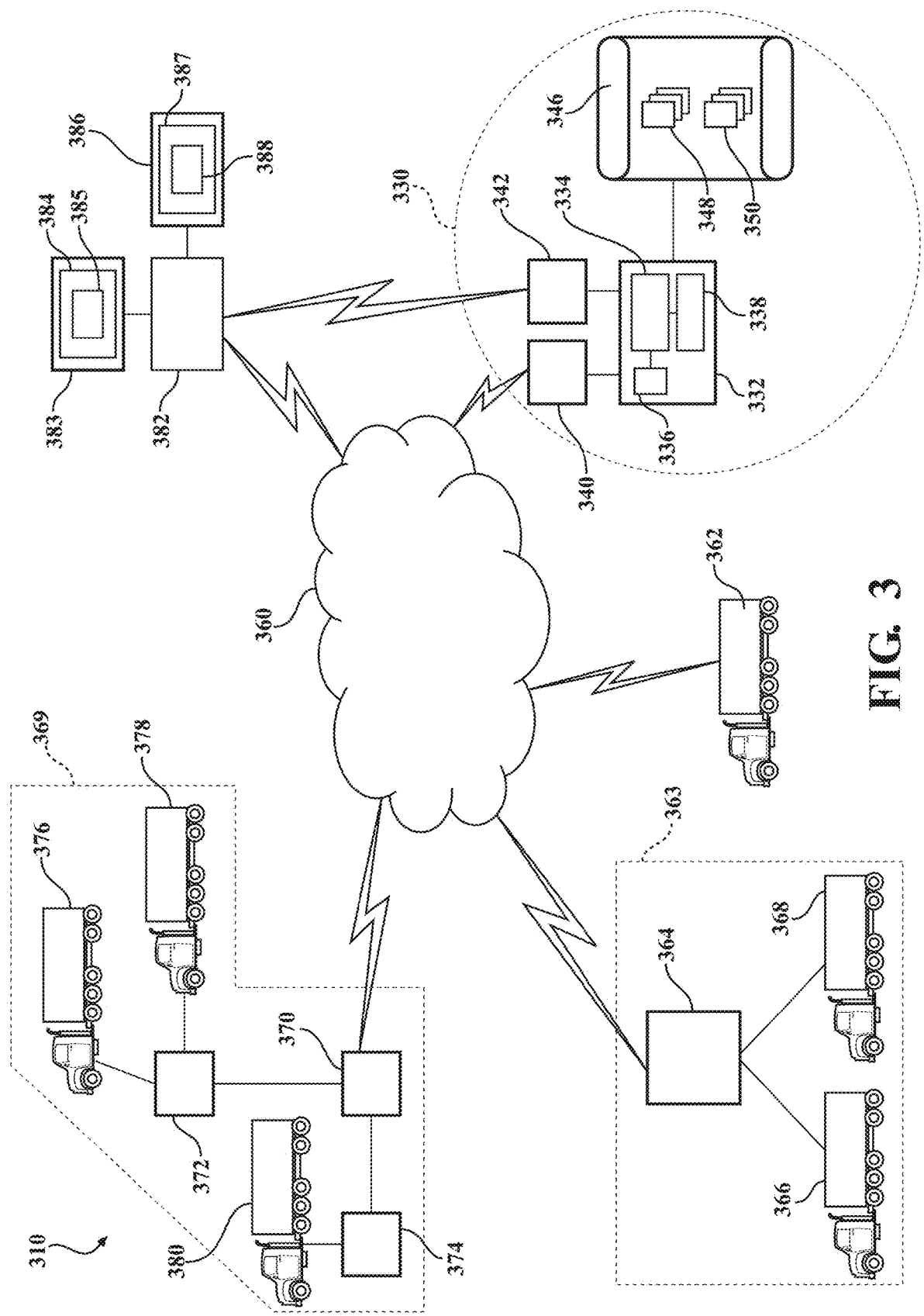
FIG. 3 illustrates one example of the system for monitoring managing a supply chain using a canonical model.

Referring to FIG. 3, a more detailed view of the system 230 is shown as system 330. The system 330 may include a dedicated computing device 332 having a circuit 334. The circuit 334 may be one or more processors having instructions to perform any of the methodologies disclosed in this specification. The circuit 334 may be in communication with the memory 336 containing instructions so as to configure the circuit 334 to execute any one of a number of different methodologies disclosed in this specification. The instructions may be in the form of different modules that may be stored within the memory 336. The circuit 334 may also be in communication with a data exchange engine 338, which functions to map all incoming data for that company, in the case of an OEM, into a common data format for fixed facilities (LADs) and modes of transportation (MADs). The circuit 334 may be in communication with the database 346. The database 346 generally includes a number of different data types and data structures. However, in this example, the database 346 includes location asset designators ("LADs") 348 as well as modal asset designators ("MADs") 350. In addition, as will be described later, the database 346 may also include sensor asset designators ("SADs").

The LADs 348, as will be described later in more detail, include a set of locations to which items are transmitted to or from by different transit entities. The MADs 350 represent the transit entities and can incorporate any one of a number of different transit entities, as will be described later in this specification. In communication with the circuit 334 are data collection devices 340 and 342. In this example, there are two data collection devices, but any one of a number of different data collection devices may be utilized. These data collection devices essentially allow the system 330 to communicate with external systems.

As stated previously, the circuit 334 is in communication with the database 346 that contains both the LADs 348 and the MADs 350 (and possible SADs). As stated before, the MADs 350 are essentially the transit entity, which could include things such as trucks, planes, rail, ships, and the like. It should be understood that a MAD will essentially include any type of transit entity that is capable of moving items from one location (i.e., one LAD) to another location (i.e., a second LAD).

In this situation, the MADs 350 may be providing data to the circuit 334 through a distributed network 360, such as the Internet. In one example, the MAD 350 is shown as a truck 362 that directly provides data to the distributed network 360 and to the data collection device 340, which in turn sends this information to the circuit 334. From here, a circuit 334 can update the MAD 350 that relates to the truck 362. This information could include the number of hours that the truck is traveling or the location of the truck, or even further information. In this example, the truck 362 directly reports this information to the circuit 334.

However, it should be understood that there may be other methodologies of reporting information to the circuit 334. For example, box 363 indicates a trucking company that manages its transit entities 366 and 368 internally. Information from the transit entities 366 and 368 are provided to a central server 364 of the trucking company. From there, the central server 264 of the trucking company can then provide this information to the circuit 334 via the distributed network 360.

In yet another example, another system is shown in box 369. Here, box 369 includes multiple transit entities 376, 378, and 380. Transit entity 380 provides its information to a server 374. Transit entities 376 and 378 provide their information to another server 372. Servers 372 and 374 then send their information to server 370. So, for example, this could be a situation that involves multiple trucking companies utilizing a common service provider that provides and collects this information on behalf of multiple trucking companies. Again, like before, this information provided to the server 370 can then be sent to the circuit 334 and the MADs 350 associated with the transit entities 376, 378, and 380 can then be updated regarding the information received from these transit entities, such as location or other information.

As such, the circuit 334 is able to update information regarding both the LADs 348 and the MADs 350 as the transit entities move throughout the canonical model between the LADs 348.

This information that is generated and tracked by the circuit 334 can then be provided to a number of different users using devices 383 and 386. Here, the devices 383 and 386 may be a terminal or computing device that can be operated by a user. The devices 383 and 386 may be connected to a network access device 382 that allows the devices 383 and/or 386 to communicate with the circuit 334 through the distributed network 360 or alternatively through a more direct connection to the system 330 via a data collection devices 342. The devices 383 and 386 may each have display areas 384 and 387 capable of displaying a user interface 385 and 388 that allow the users of the devices 383 and/or 386 to both input data so as to update or create the LADs 348 and/or to update or create the MADs 350. Additionally, the user interfaces 385 and 388 also provide the ability for the circuit 334 to provide information regarding the LADs 348 and the location of the MADs 350 as they travel through the canonical model.

It is also worth noting that in the example shown in FIG. 3 that each of the transit entities are trucks. Again, it should be understood that this is merely an example, and the transit entities could be any type of entity capable of moving items from one location to another. As such, these entities could include items such as planes, ships, rail, and the like.

Figure 4B:
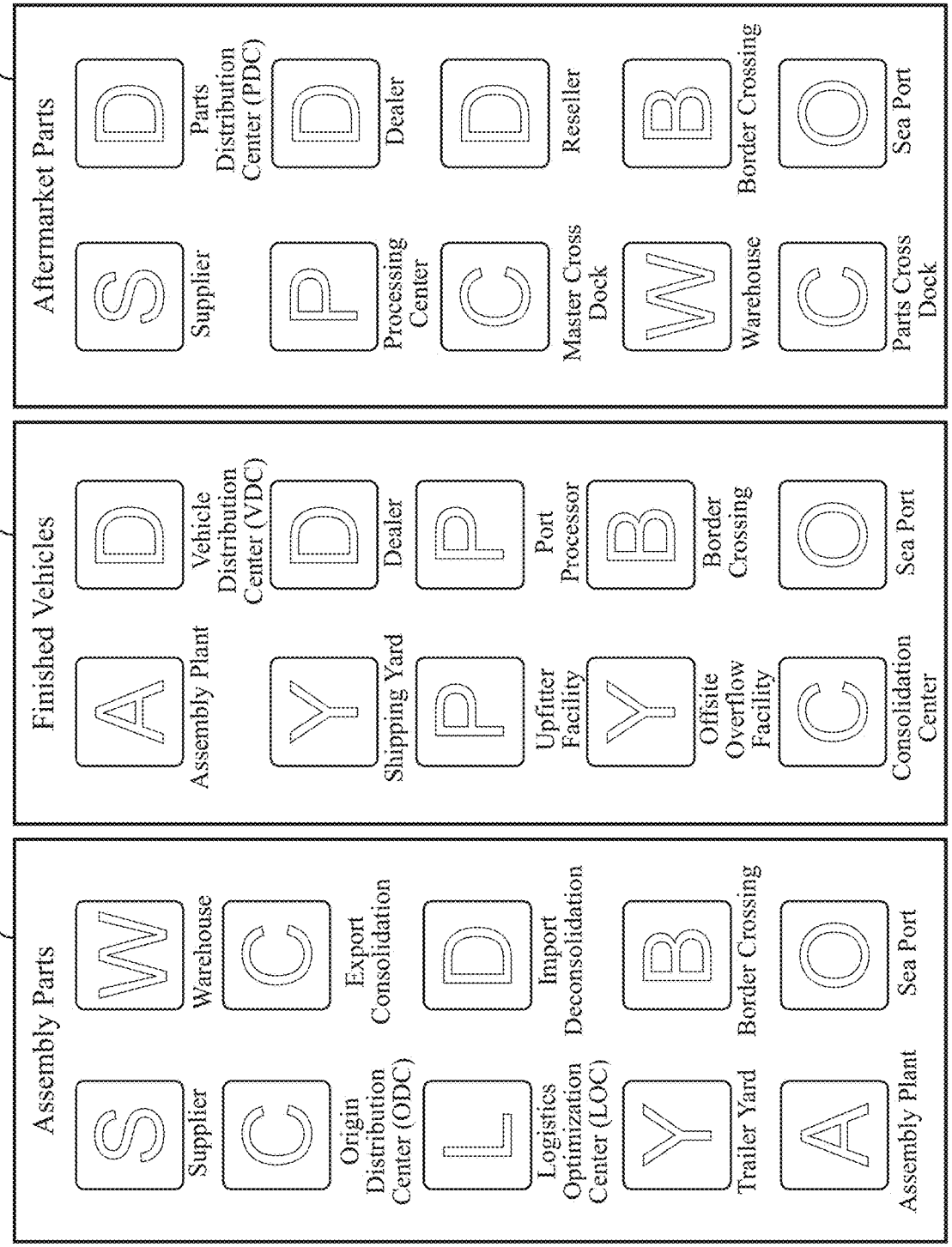
Figure 4C:
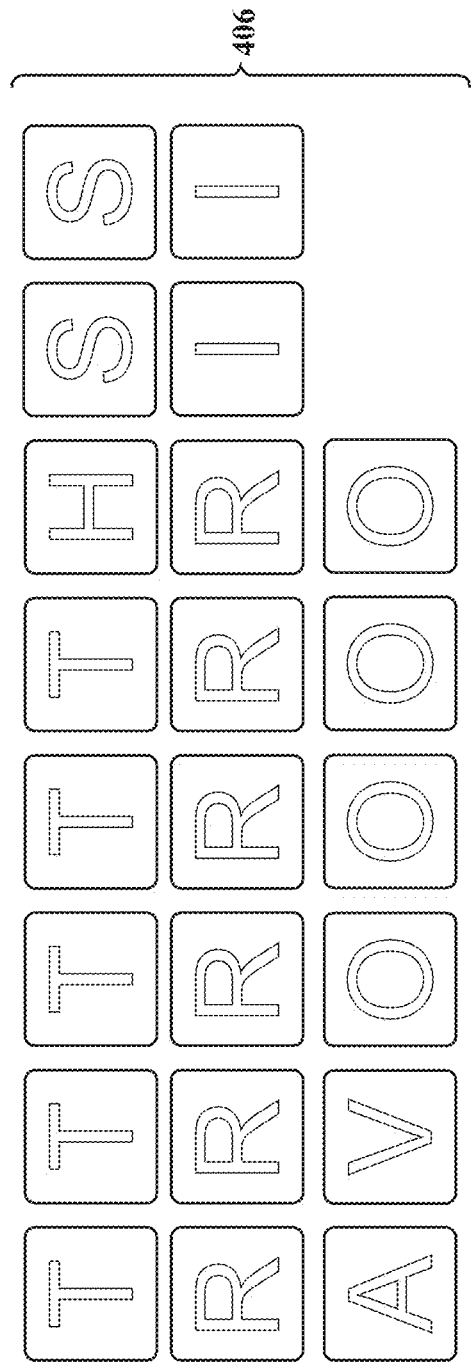

Referring to FIGS. 4A-4C, a more detailed explanation of the elements making up the canonical model are shown. In FIG. 4A, a listing of the LADs is shown, with LAD names in column 450, LAD icons in column 452, and LAD descriptions in column 454. As stated before, the LADs are typically non-movable objects or locations where items are sent to and from by the MADs. Here, the LADs include facilities that could be a supplier, a consolidation facility, a cross-dock, logistic center, yard, customer plant, warehouse, distribution facility, border crossing, port, processor facility, dealer, carrier terminal, and/or rail terminal. The choice of these LADs was generated based on the inventor's experience in the logistics industry concerning the automotive industry. Of course, these LADs can be used across any one of a number of different industries that require the shipment of parts and finish goods to and from different facilities. Essentially, an OEM or supplier classifies each of its facilities under one of these LADs. This provides standardization of these different facilities. As it is well known, different OEMs and different suppliers refer to different locations using different terminology. The OEMs and suppliers essentially code each of their facilities using one of the LADs indicated in FIG. 4A. It should also be appreciated that this list of LADs could be expanded to include other types of LADs referring to other types of locations. A LAD may be a data structure that includes the identity of the LAD and the location of the LAD. The LAD location may be in the form of a geo-fenced location.

Referring to FIG. 4B, a collection of different LADs 400, 402, and 404 have been shown to indicate which LADs may be associated with assembled parts, finished vehicles, and aftermarket parts, respectively. Again, a description of each of these LADs is shown in FIG. 4A.

LADs can also include sub-locations. For example, a LAD may be associated with a fairly large fixed entity, such as an assembly plant. This assembly plant may have different areas for providing access, loading, unloading, or where other operations occur. As such, LADs may also include sub-locations. The sub-locations can include things such as gates that provide access, loading docks, and the like.

Now that it has been explained what is meant by LADs, now an explanation of the MADs will be made. Referring to FIG. 4C, MADs are canonical model representations of transit entities that transfer goods from one point to another. The MADs 406 shown include 24 different types of MADs. For example, these MADs can include multi-stop truckloads, soft side trailers, flatbeds, direct truckloads, full truckloads, partial truckloads, vehicle hall away, truck shuttle runs, parts trailers switch, railway tri-level, railway bi-level, trailer on a flat car, rail flat car, container on a flat car, rail bi-level and tri-level, rail boxcar, intermodal, air cargo, vehicle to logistics, and different types of ocean-going vessels. Again, while only 24 MADs are shown, it is possible to include more or fewer MADs. As such, the OEMs or suppliers utilizing the canonical model of the system essentially have to categorize each of their different transit entities into one of these MADs. Again, classifying their transit entities into a standard set of MADs improves the canonical model and allows OEMs and suppliers to correctly track the shipments of their transit entities between different locations. A MAD may be a data structure that includes the identity of the MAD and the location of the MAD. The map location may be generated from the GPS coordinates of the transit entity that relates to the MAD.

The location of a particular MAD may be generated periodically. Further still, the location of a particular MAD may be represented as a coordinate but could also be represented in a word-based format. As explained in further detail later in this description, one type of location identifier system that may be utilized to identify the location of a particular MAD is what3words. In the what3words implementation of geocodes, a combination of three words is used to address every 3-meter by 3-meter square on earth. In one example, the location of the MAD may be given after the transit entity that is associated with the MAD has been at a standstill for a predetermined period of time. For example, if the transit entity is a truck and the truck is not moving, a location of the MAD associated with the truck can be given. Again, the location can be in the form of the what3words format.

Figure 5:
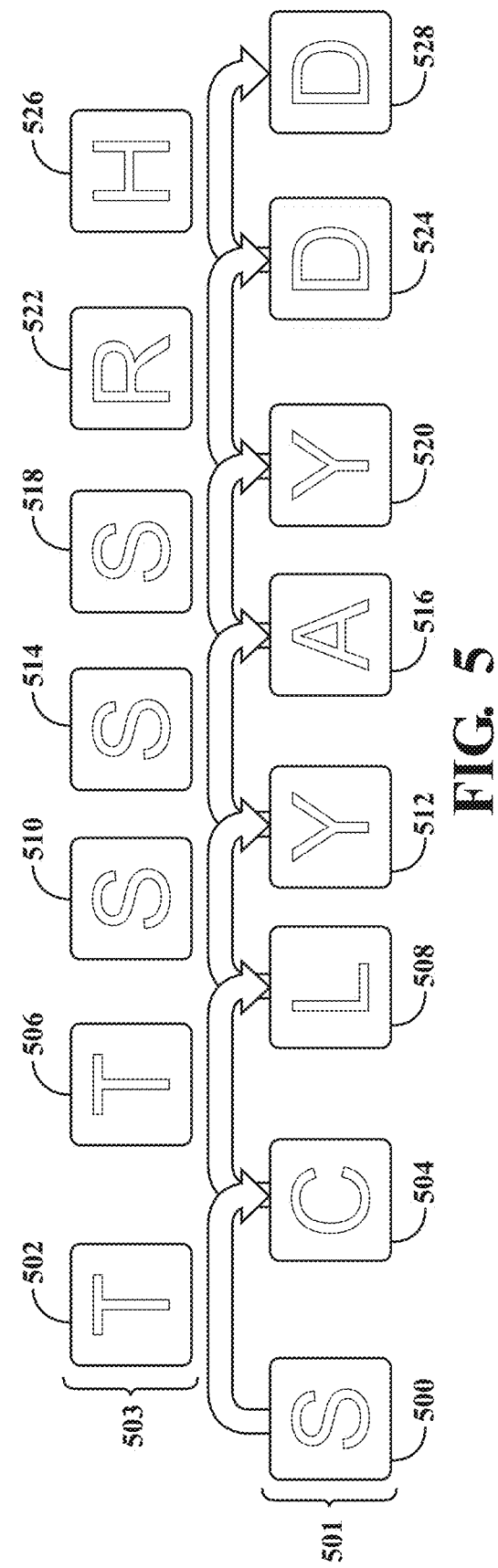
FIG. 5 illustrates an example of the transit of items between different locations using the canonical model.

Referring to FIG. 5, an example is shown of the transmission of different parts between the LADs 501 by MADs 503 in the canonical model. Here, the item begins with the supplier 500, the items are taken from the supplier 500 by a partial truckload MAD 503 to a consolidation facility 504. Afterward, the items are taken from the consolidation facility 504 to a logistical center via a full truckload 506. From the logistical center 508, the items are taken to the trailer yard 502 by a truck shovel run 510. The items are then taken from the trailer yard 512 to the assembly plant 516 by another truck shuttle run 514. At the assembly plant 560, the items are put together as a vehicle and are shipped to a vehicle shipping yard 520 by a truck shuttle run 518. The vehicles are then transferred from the vehicle shipping yard 520 to the distribution facility 524 by a rail 522. Afterward, the vehicles are then sent from the distribution facility 524 to the dealership 528 via a vehicle haul away 526.

As such, as can be seen in the example given in FIG. 5, the canonical model standardizes the different locations along the supply chain into the LADs 501 and the transit entities used to move the items along the supply chain into the MADs 503. This standardization of elements making up the canonical model makes it possible to track items shipped through the industrial supply chain without expending significant resources.

The canonical model can be analyzed using any one of a number of different artificial intelligence architecture tools. For example, each of the MADs could also information related to the type of MAD, the origin of the MAD, the destination of the MAD, and the actual location of the MAD, but could also include additional information such as mechanical issues of the MAD, hours of service of the MAD, driver behavior, carrier behavior, and the overall speed of the MAD.

The LADs could include such things as on-time pick-up historical information, on-time delivery historical information, and other historical information. Additionally, the canonical model could be utilized to include such things as external designation such as weather conditions, road conditions, traffic, seasonality issues, such as weather, road closures, construction, and other information.

From here, the circuit 334 could be configured with a number of different artificial intelligence architectural tools that monitor and constantly update and improve not just the collection of this data but the results based on this data. The results of this data could give a more accurate just-in-time delivery of the MAD to the LAD and an in-window delivery. It could also show a cumulative dwell of the MAD. As it is known, a dwell of the MAD is a situation where the MAD is sitting and being unutilized because it is waiting to load or unload. The dwell time could also include other situations where the MAD has simply gone off-target or is required to stop for any one of a number of different reasons. This could also include information such as in transit dwells and other types of dwells that show other situations where the MAD has simply gone off course or is stuck in traffic or is performing other logistical operations outside its primary logistical operation. Again, this canonical model has significant usefulness for not only allowing and standardizing the different transit entities, the different locations, and other information but can also then be utilized into an artificial intelligence engine to output any one of a number of different useful data points and tracking information.

For example, the output data may include things such as a just-in-time delivery window, a cumulative dwell, a cross-dock dwell, and in transit dwell. In transportation, dwell time or terminal dwell time refers to the time a vehicle spends without moving. The just-in-time delivery window is a window wherein the shipment is expected to reach its destination. A cumulative dwell indicates the entire time in which a shipment was stopped. An in-transit dwell indicates the time in which a shipment was stopped between locations. A cross-dock dwell indicates the amount of time a shipment spent at a destination.

In addition, the conical model allows one analysis using artificial intelligence architecture tools to determine certain friction points, wherein issues regarding shipping can be discovered. For example, these friction points may include dwell times while in transit or at the destination. If the same issue occurs time and time again, this can be determined to be a friction point, and appropriate action can be taken at that friction point so as to reduce dwell times.

Figure 6B:
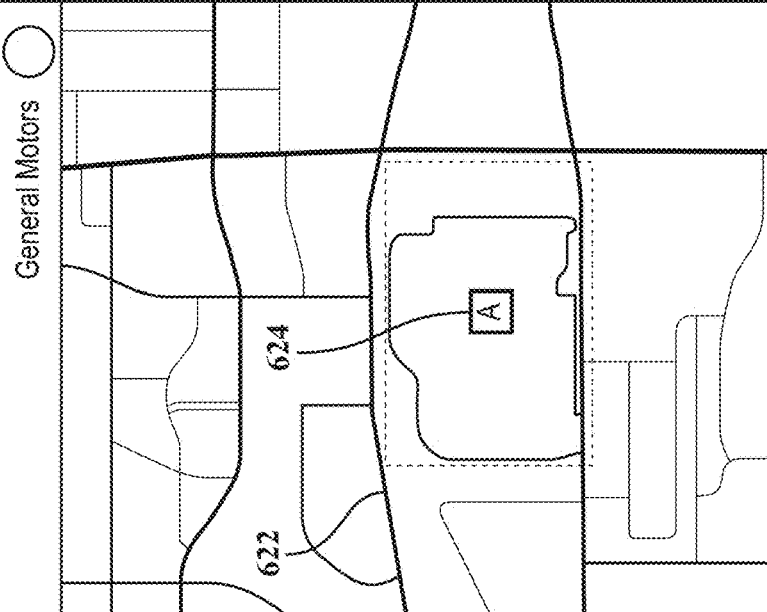
Figure 6C:
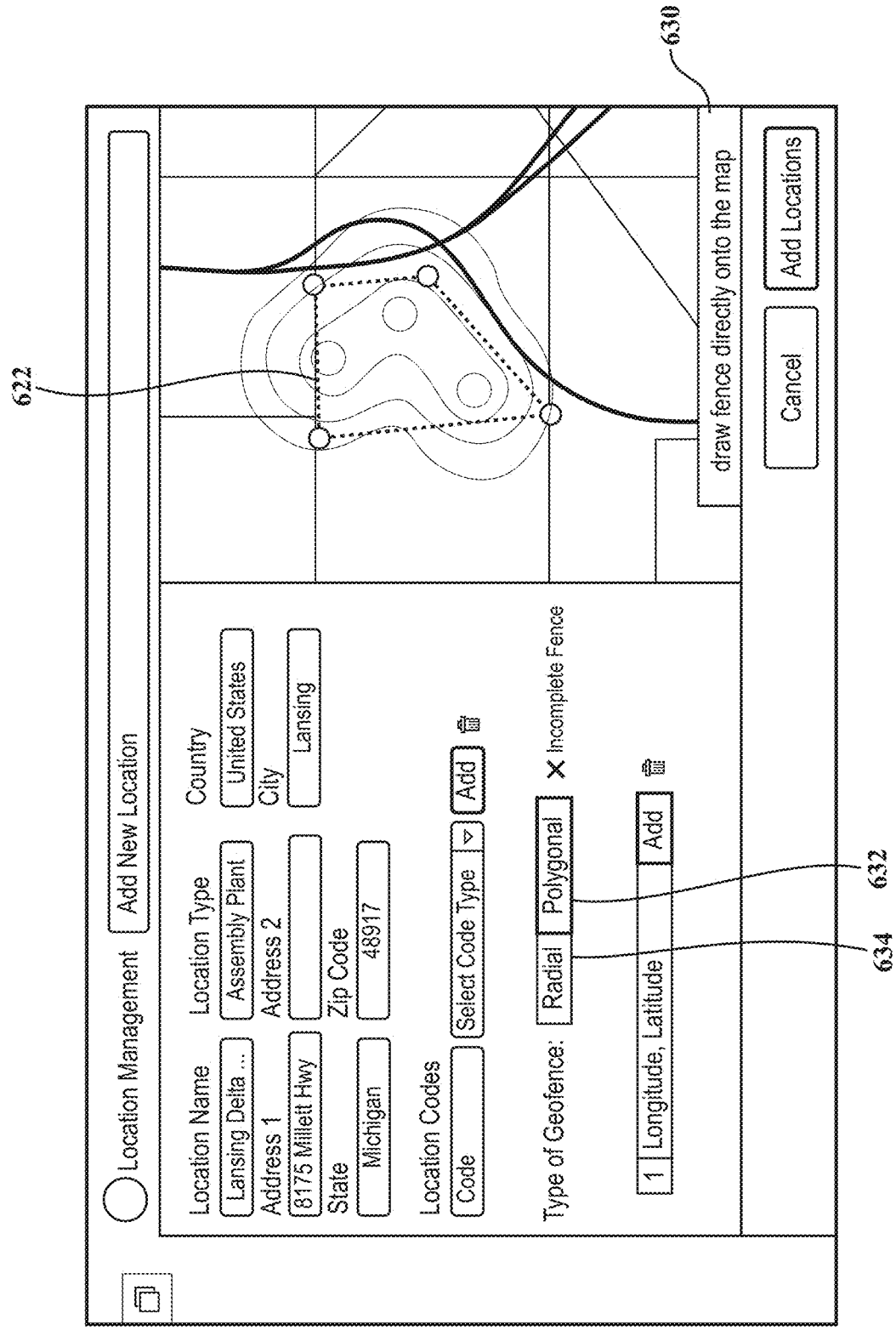

Referring to FIGS. 6A, 6B, and 6C is an example of the graphical user interface that can be utilized to generate a LAD. As stated before, different OEMs and different suppliers utilize different terminology to refer to different locations along the supply chain. These differences make things extremely confusing and difficult when trying to harmonize across different suppliers and OEMs and also utilizing different types of transportation services and trucking companies that again utilize their own form of referring to different locations and different transit entities.

FIG. 6A shows the user interface that allows an OEM or supplier to generate a LAD and, therefore, the data structure making up the LAD. Here, the user interface provides an input button 602 that allows one to add a single location, if one selects this button, a user interface 610 is shown. The user interface allows the user of the interface to input the name and address of the location as shown in boxes 612.

Instead of, or in addition to utilizing an address, other types of location identifiers can also be associated with a LAD. For example, a LAD can be given a location identifier that is in a multiple word format. Addresses or other geographic identifiers, such as GPS coordinates, latitudinal/longitudinal coordinates, and the like, can be difficult for humans to remember and process. One type of location identifier system that may be utilized to identify the location of a particular LAD is what3words. In the what3words implementation of geocodes, a combination of three words is used to address every 3-meter by 3-meter square on earth. The system encodes geographic coordinates into three permanently fixed dictionary words. For example, the front door of 10 Downing Street in London is identified by/// slurs.this.shark. What3words differs from most location encoding systems in that it displays three words rather than strings of numbers or letters. Incorporated herein by reference in its entirety is the pending U.S. application 2016/0073225 by Ganesalingham et al., published on Mar. 10, 2016, which describes a geocoding method and is currently assigned to What3 Words Limited.

From there, the user has to select any one of a number of pre-defined LADs, as shown in box 614. Again, these LADs are pre-defined so as to allow harmonization of these different physical locations across different suppliers and OEMs, so the same terminology is utilized. Box 616 allows the user of the interface to request to rename the facility. Boxes 618 allow the user of the user interface to select one of the different product types. Here, these types of products are in the automotive industry that refers to things such as assembly parts, finish vehicles, and aftermarket parts. Additionally, the user interface 600 allows you to import locations by selecting the import button 604. This can be utilized and very useful in situations where numerous LADs have already been created and are simply importing them. Additionally, after a LAD is generated, the user has the ability to edit the LAD by simply selecting box 606. When selecting, a user interface is brought up similar to a user interface 610, as shown.

Referring to FIG. 6B, the location of the LAD can be specifically defined in geo-fenced. Here, the LAD 624 is an assembly plant. Because it is important to know when transit entities or MADs are reaching the LAD 624, a geofence 622 can be set up. This geofence can be done with user interface 620 that allows when to define any one of a number of different points so as to form a polygon geofence. A polygon geofence has certain advantages in that you can provide very specific definitions of the geofence. This can be very useful because plants take any one of a number of different shapes.

For example, referring to FIG. 6C, one can either select a polygon button 632 or a button 634. If the polygon button 632 is selected, one can easily draw a geofence 622 using a pointing device, such as a mouse. Of course, a radial geofence may be set by selecting button 634. A radial geofence is a circular geofence. A circular geofence is simpler to set up but is generally not as accurate as it cannot specifically be set around the specific perimeters of a manufacturing facility or any other type of LAD.

Additionally, LADs can also be defined to include certain sub-locations. For example, a LAD may be associated with a very large facility, such as a manufacturing facility. This manufacturing facility may have numerous locations associated with this facility. For example, the manufacturing facility could have one or more entrance gates, loading/unloading docks, parking facilities, storage facilities, and the like. As such, a LAD can further be defined to include these sub-locations, appropriate identifiers, and location information. Any type of location information format can be utilized, but in one example, the location information for one or more sub-locations of the LAD may utilize the what3words format. Generally, if a geofence is utilized to define an area of a fixed entity that is associated with a LAD, sub-locations will be within the geo-fenced area.

Figure 7A:
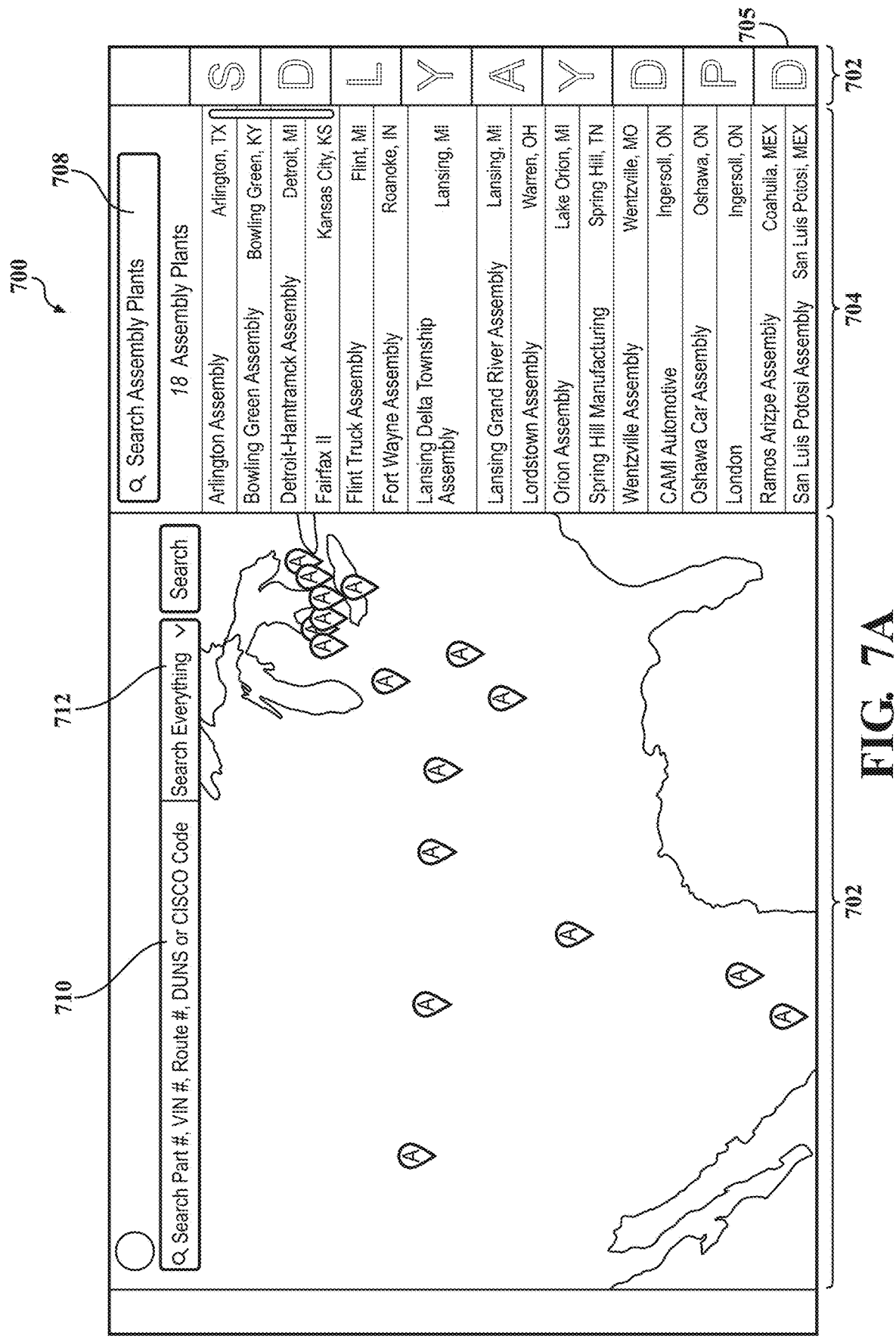
Figure 7B:
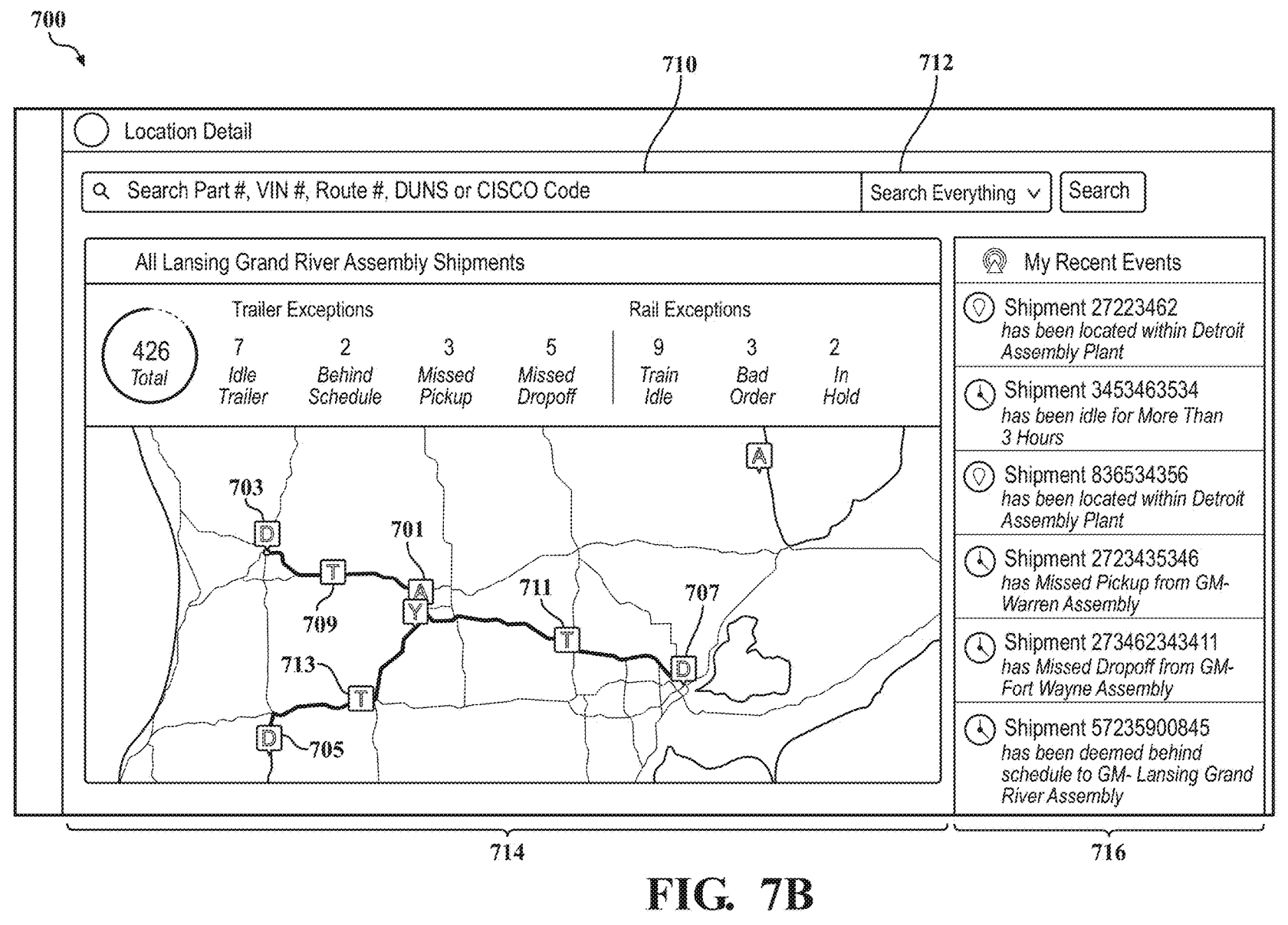

Referring to FIGS. 7A and 7B, a user interface 700 is shown illustrating the canonical model. Here, the user interface has a map portion 702 that, in this example, shows all of the assembly facilities. These assembly facilities can be shown in a list shown in section 704. In map portion 702, the LADs are shown as different icons. By simply selecting one of these LADs, you can then bring up all of the LADs related to one specific LAD designation, so for example, if the dealer LAD 705 is selected, all of the dealers located on the map portion 702 would be shown. In addition, the user interface has a number of different search features. For example, the search box 710 allows one to search for a specific vehicle or MAD or any one of a number of different types of entities either they be LADs or MADs. Limits on the search can be performed by selecting different search limits in box 712. Box 708 allows one to search for different assembly plants. As such, if the LAD for the dealer 705 were selected, the search box would then allow you to search all of the dealers.

Referring to FIG. 7B, the user interface 700 is shown that shows a map that indicates all assembly shipments occurring at LAD 701. Here, one can readily see different LADs 703, 705, and 707. Additionally, also shown are different MADs 709, 711, and 713, as well as the routes taken and to be taken by these MADs 709, 711, and 713 to the assembly plant LAD 701. Again, in search box 710, one can search for a number of different items such as different LADs by things such as VIN, route, and other variations. Additionally, as shown in column 716, different information regarding different shipments can be shown as well. The shipment information could include indicators indicating if the shipment is on time (i.e., a green indicator), a shipment that's delayed (i.e., a yellow indicator), or a shipment that has simply been missed (i.e., a red indicator).

Figure 8:
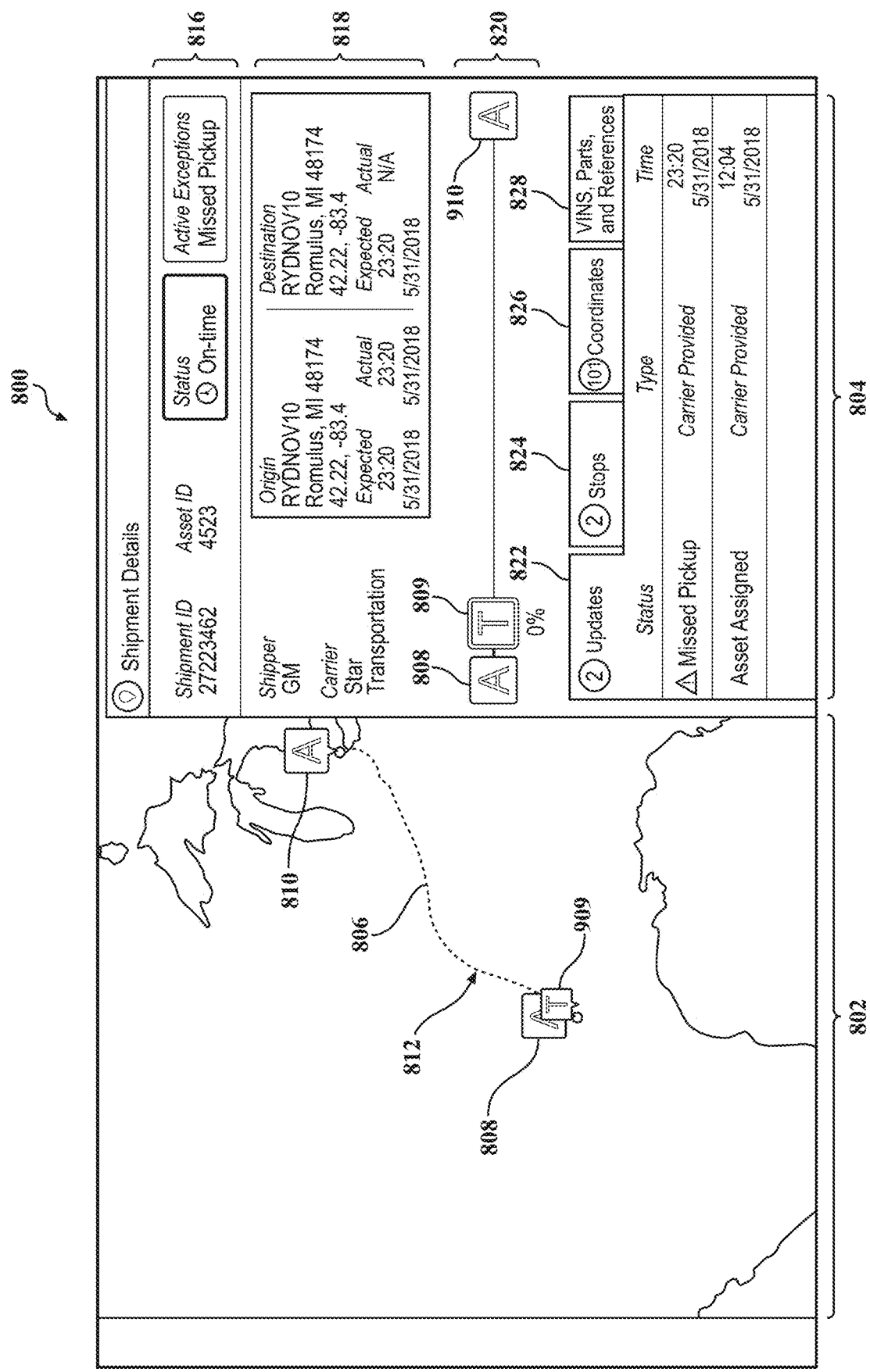
FIG. 8 illustrates a user interface that shows modal asset designator associated with a location asset designator.

Referring to FIG. 8, the user interface 800 is shown. Here, this shows two different assembly plants as LADs 808 and 810 and a MAD 809 that is moving between the facilities, represented by LADs 808 and 810 along route 806. As the MAD 809 moves along route 806, the user interface could populate the map with a number of different indicators indicating the direction of the MAD 809 at different time intervals and the location as well. This essentially leaves a set of breadcrumbs so that the person monitoring the shipment can easily see where the MAD has been along the route 806.

In the portion of the user interface 904 shown to the right, a number of different informational elements can be shown. For example, in portion 816 the shipment I.D., asset I.D.'s and status, as well as active exceptions, can be shown. In section 818, information regarding the shipper, the carrier, the origin, and the destination can also be shown. In section 820, the LADs 808 and 810 are shown as well as a graphical indication of how far the MAD 809 has moved along the route between these two locations. Additionally, information can also be shown by selecting different tabs. For example, if one selects tab 822, updates can be shown regarding delivery status or any missed pickups. If one selected tab 824, stops that the MAD 809 has made can also be shown. If tab 826 is selected, the coordinates of the MAD 809 can be shown over a period of time. Finally, if tab 828 is selected, information regarding the vehicle identification number of the MAD 809, parts, and other reference information can also be provided to the user. Again, this canonical model allows one to standardize different transit entities as one of a select number of MADs in different locations as one of a select number of LADs. These LADs and MADs then can be entered into the canonical model, and then the information in the form of a map, user interface, and other data can be provided to the user.

For example, information can be shown, as indicated in FIG. 9. Here, the graphics1 user interface 900 allows one to monitor all current shipments for a certain OEM, as shown in box 902. Portions of the user interface 904 show trailer exceptions such as if the trailer is idle, behind schedule, missed a pickup, or missed a drop-off. Rail exceptions could be shown in portion 106.

Additional information could be broken down by facility, part, and a combination of both part and facility. For example, in portion 908, information regarding a certain manufacturing assembly plant LAD is shown. In portion 910 information regarding a certain part, for example, if the part was delivered on time, behind schedule, in an idle trailer, missed pick up, or missed drop off. Additionally, this information could be combined to discuss certain parts at certain facilities, as shown in section 912. Section 914 allows one to search for recent events and select these different events, which then will provide more information in the graphical user interface 900.

Figure 10A:
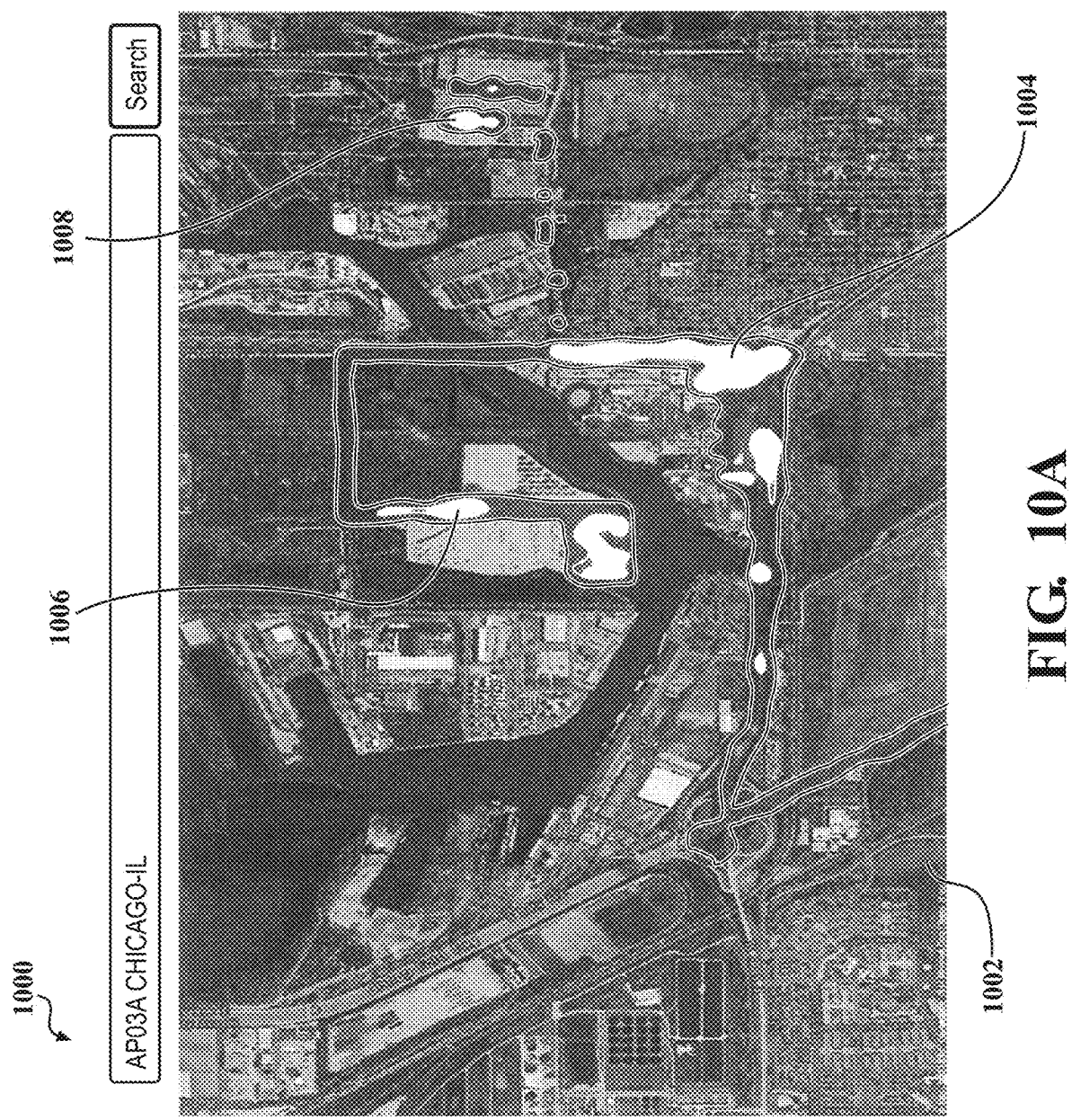
FIGS. 10A and 10B illustrate a user interface that shows a heat map illustrating the dwell time of one or more location asset designators.

The canonical model also allows information to be visually prepared based on the movement of the MADs between different LADs. For example, referring to FIG. 10A, the user interface 1000 shows a heat map. As the colors move from green to yellow, the colors indicate the concentration of parts located near a LAD 1004. Here, near the LAD 1004, it can be seen that there is a significant concentration of parts located on MADs. This indicates some congestion within and around the LAD 1004. Additionally, one can easily see that parts are being located in a nearby shipping yard, as indicated in the yellowish heat areas 1006. Furthermore, it is also possible to view the location of parts in the concentration located in areas outside of the assembly plant, as indicated in the yellow heatmap section 1008. As such, this can give the user of the user interface a good idea of what parts are being stuck in the shipment process. Obviously, it is generally accepted that you want parts quickly moving in and out of different LADs as quickly as possible. An indication that of yellow or even red indicates that these parts are sitting idle and are not being utilized efficiently. As such, the user of the user interface and perhaps the artificial intelligence algorithms utilized by the circuit could be utilized so as to more efficiently coordinate the delivery and leaving time of these different MADs.

Figure 10B:
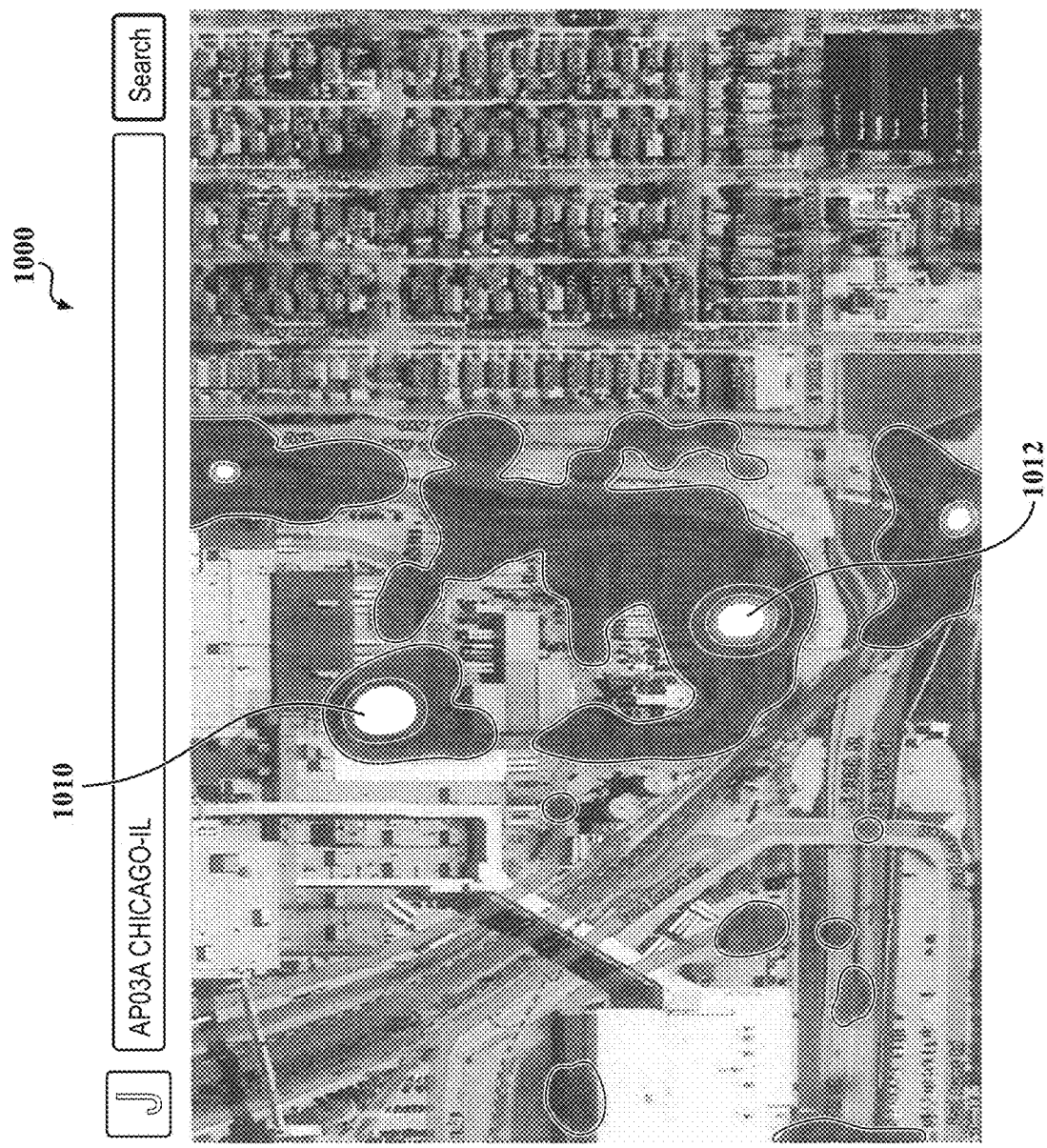

FIG. 10B shows a similar heat map user interface 1000. Here, a concentration of parts can be seen in heat map areas 1010 and 1012. Again, this indicates that there are significant dwell times in these areas, and steps could be taken to minimize this so as to improve the flow of the parts both in and out of different LADs.

As previously stated, the canonical model described in this specification is not limited to just industrial supply chain logistics operations for the assembling of vehicles or other products. The canonical model of this disclosure can also be applied to a number of different situations that involve the delivery or application of any type of good or service. As such, the following figures will provide a description of applying the canonical model of the specification to the medical field, involving the delivery of medical-related items in the examination of patients.

As such, in order to apply the canonical model to the medical field, FIG. 11 illustrates a variety of medical-related LADs. Here, column 1102 illustrates the icon for each of the medical-related LADS, column 1104 provides the name of each of the medical-related LADs, while column 1106 provides a description for each of the medical-related LADs. In this example, the LADs of FIG. 11 relate to different hospital locations, including receiving, storage, admissions, examination, imaging, lab, anesthesia, operating theater, pharmacy, patient room, discharge, and facilities. It should be understood that the LADs of FIG. 11 are just an example of some of the LADs that could be created for a hospital or medical setting. This list can be varied based on the different needs of different organizations.

The LADs in this example are "internal LADs." In other words, the LADs in this example are internal to a hospital facility which may be a single or multiple building. It should be understood that the LADs making up the canonical model can include both "internal LADs" that may be internal to a building but also "external LADs" that may identify different facilities located at different locations.

FIG. 12 illustrates an example of a LAD 1202 for a hospital. This LAD 1202 includes a LAD name 1204, which may be a letter indicating the name of the LAD. In this example, the LAD 1202 has been given the letter "I" which stands for imaging. The name of the LAD may be provided in a section 1206 of the LAD 1202. The LAD 1202 may also include a floor number 1208 and a subcategory 1210. The subcategory can provide some greater definition regarding the LAD name 1204. In this example, the LAD name 1204 is imaging, while the subcategory 1210 is x-ray. As such, this location relates to an x-ray facility in a hospital located on the first floor of a hospital. The data structure making up the LAD is similar to what was described before. Moreover, the data structure may include both the identity of the location as well as the location itself, which may be in the form of a geo-fenced location.

In this example, instead of referring to the moving assets as MADs, the moving assets will be referred to as sensor asset designators ("SADs"). The SADs are somewhat similar to the MADs other than the SADs may be one or more sensors that are able to track the movement of an object or patient that they are attached to. In a hospital or medical setting, the movement of patients and objects used to service patients may be tracked to improve greater efficiency. The data structure of a SAD includes the identity of the sensor and the location of the sensor. As such, the sensor may be a type of sensor that has the ability to determine the location of an object that is attached to it as it moves.

Here, one or more sensors may be attached to different patients or objects to track the movement of the patient or object. For example, referring to FIG. 13, the SADs in this figure include SADs related to wearable sensors, pallets for carrying medical items, totes for carrying medical items, large medical assets, or could include any one of a number of different sensors that relate to the "Internet of things." It should be understood that the sensor utilized in the SAD can be sensor agnostic and does not necessarily need to be tied to one type of system.

Each SAD may include information relating to the identity of the sensor that relates to the SAD as well as the location of the sensor that relates to the SAD. The location information of the sensor can be in any one of a number of different formats. In one example, location information related to the SAD may be in the form of the what3words format. The what3words format is easy for humans to remember and understand, so information regarding the location of a particular SAD may be stored and/or presented in the what3words format.

As such, one can track different objects or patients through the medical setting and know where these objects or patients are at any one time. FIG. 14 illustrates a SAD 1404. Here, the SAD 1404 includes a letter identifier 1406 indicating the type of sensor that relates to the SAD 1404. The SAD 1404 may also have a general identifier 1408 indicating what the SAD 1404 relates to. In this example, the SAD 1404 relates to a patient is indicated by the general identifier 1408. Of course, the SAD 1404 could relate to other objects, such as medical devices, pharmaceuticals, or any object that travels through a hospital system. The SAD 1404 may also include a floor designation 1410 indicating the floor on which the SAD 1404 is located. The SAD may also provide a general description of the type of sensor as indicated in section 1412, which indicates that the sensor related to the SAD is a wearable sensor. For this example, the wearable sensor is being worn by the patient. The wearable sensor includes an identity of the sensor as well as a location of the sensor, thereby allowing the canonical model to track that specific patient as they move throughout the hospital system and know exactly where they are and who they are at any time.

FIG. 15 illustrates one example of different objects moving through different hospital locations. Here, FIG. 15 includes eight LADs 1502 related to different hospital locations. Here, the eight LADs relate to hospital admissions 1504, lab 1506, x-ray 1508, MRI 1510, pre-operation 151, operation 1514, postop 1516, and hospital room 1518. FIG. 15 also illustrates seven different SADs 1520. For example, in this canonical model, one can track the SAD 1522 as it travels between hospital admissions 1504 and lab 1506. The SAD 1524 can be tracked as it moves from the lab 1506 to the x-ray 1508. The SAD 1526 can be tracked as it moves from x-ray 1508 to MRI 1510, and so on.

FIG. 16 illustrates an example of the movement of a patient having a wearable sensor indicated as SAD 1602. Here, the patient is wearing a wearable sensor that is associated with the SAD 1602. The patient associated with the SAD 1602 can be tracked as they move through different LADS 1604 of the canonical model. Here, the wearable sensor includes a sensor identity that identifies the patient as well as the location of the sensor. This information makes up the SAD 1602. As such, as the patient travels through admissions 1606 to lab 1608 to x-ray 1610 to MRI 1612 to preop 1614, to operation 1616 to postop 1618 to the hospital room 1620, the movement of the patient through these systems can be tracked.

By tracking the movement of objects or patients through the hospital system, information regarding the efficiency of using different objects, such as medical devices and pharmaceuticals, as well as the efficiency in treating patients, can be tracked and therefore improved.

Figure 17:
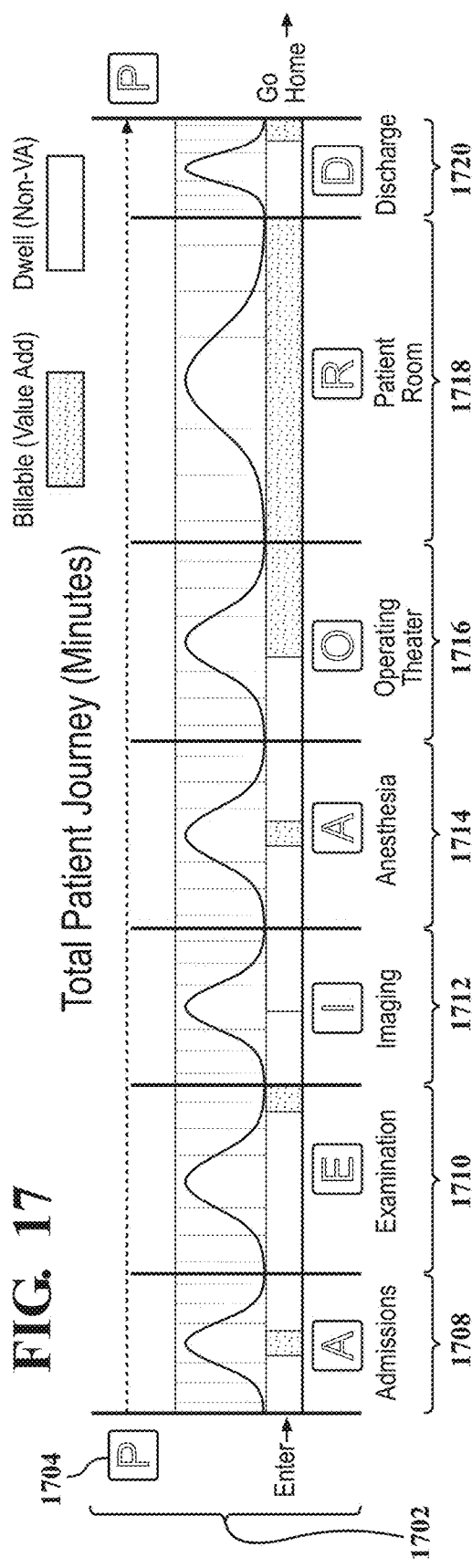
FIG. 17 illustrates a tracking chart tracking the movement of a patient through a medical facility.

For example, referring to FIG. 17, a tracking chart 1702 showing the location of a patient indicated by SAD 1704 as they move through different LADs is shown. For example, the tracking chart 1702 illustrates the amount of time this patient spent in the following LADS: admissions 1708, examination 1710, imaging 1712, anesthesia 1714, operating theater 1716, patient room 1718, and finally discharge 1720. In addition to this information, the amount of time the SAD spent receiving treatment in these different LADs can also be shown as indicated by "billable" time or dwell time. Hospital administrators generally want to reduce the amount of dwell time so as to provide prompt and efficient patient care.

Figure 18:
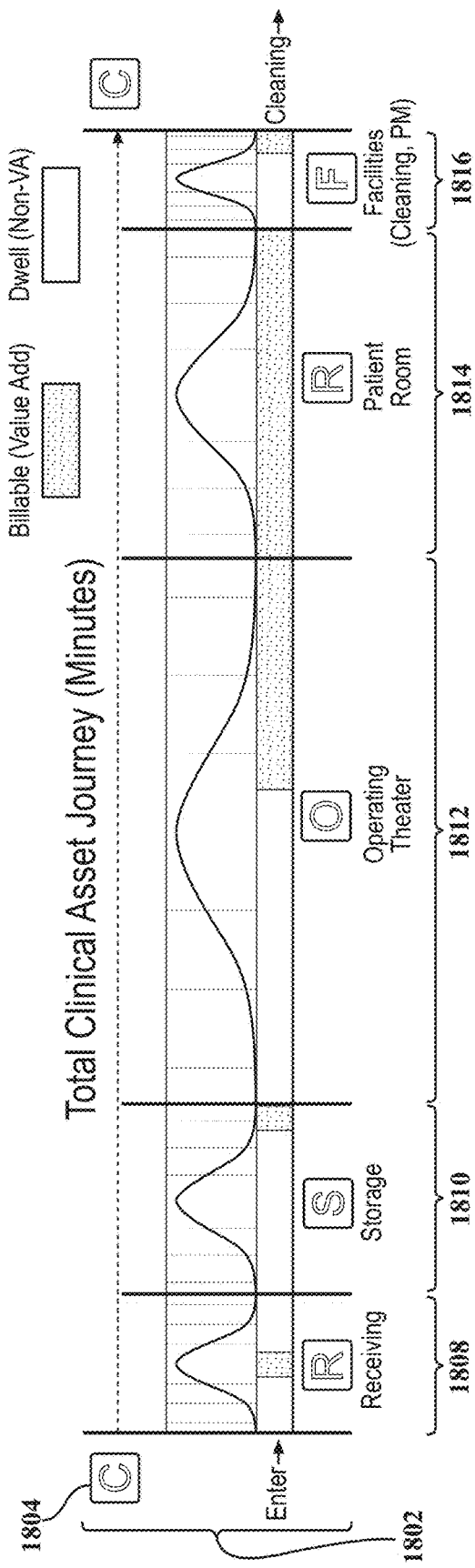
FIG. 18 illustrates a tracking chart tracking the movement of an object through a medical facility.

The same is true regarding the tracking of objects through a medical setting as well. For example, FIG. 18 shows a tracking chart 1802 that tracks the movement of a SAD 1804 through different LADs of a medical facility. These LADs include receiving 1808, storage 1810, operating theater 1812, patient room 1814, facilities 1816, and eventually to cleaning. Like before, in addition to how much time SAD spent at each LAD, a dwell time or billable time can also be deduced so as to see how much time the object being tracked was actually utilized. Like before, hospital administrators generally want to reduce the amount of dwell time so as to provide prompt and efficient patient care.

Figure 19:
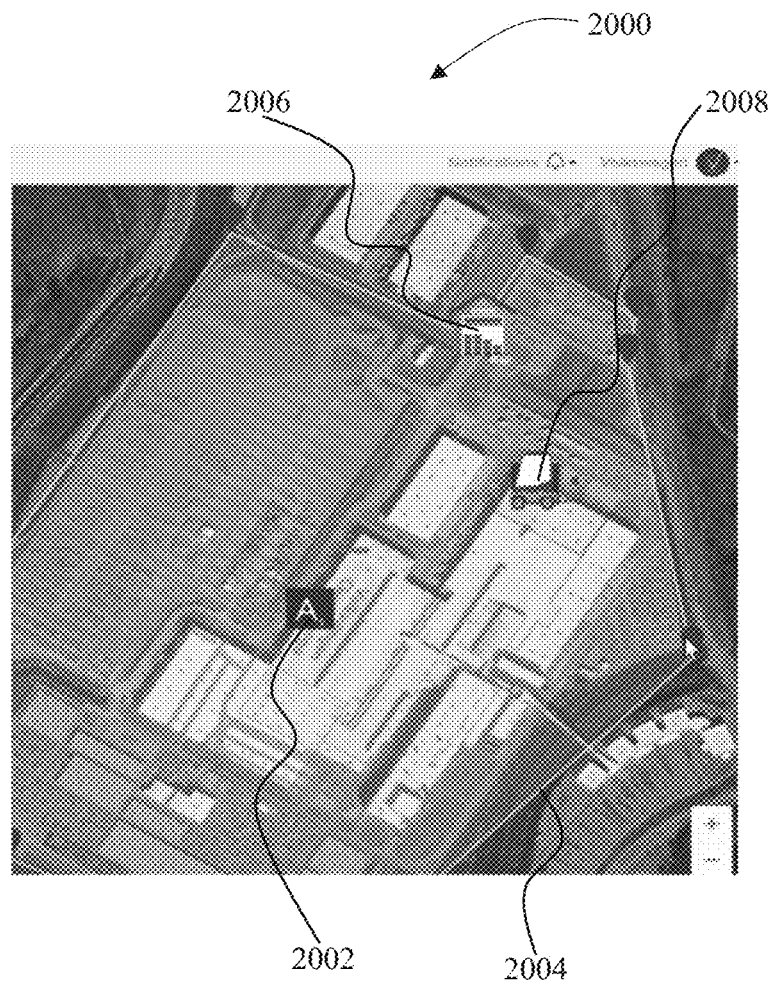
FIG. 19 illustrates an example of a LAD having sub-locations.

Referring to FIG. 19, is a screen capture 2000 illustrating a LAD 2002 that is related to a manufacturing facility. Here, the LAD 2002 utilizes a geofence 2004 to define the borders and thereby the location of the manufacturing facility associated with the LAD 2002. As stated previously, LADs have a data structure that includes a location identifier identifying the location of the particular LADs. The location identifier could be in the form of an address, coordinate, or can use another type of format, such as a word-based format, like what3words.

In this example, the manufacturing facility associated with the LAD 2002 is fairly large. In some cases, manufacturing facilities or other facilities associated with the particular LAD can be dozens or even hundreds of acres in size. In this particular example, the LAD 2002 relates to a manufacturing facility built on a 1400-acre parcel of land. As such, providing a single address or a single location for a facility associated with the LAD of this type of size does not provide much in the way of guiding where delivery should occur, where the delivery vehicle should enter/exit, and the like.

As such, the LAD 2002 also includes sub-locations. In this example, the LAD 2002 includes two sub-locations 2006 and 2008. In this example, the sub-location 2006 relates to an entrance gate, while the sub-location 2008 relates to a loading dock. The locations of the sub-locations 2006 and 2008 may be stored within the metadata of the LAD 2002. The format of the location information of the sub-locations 2006 and 2008 may be in a word-based format, such as what3words.

Figure 20:
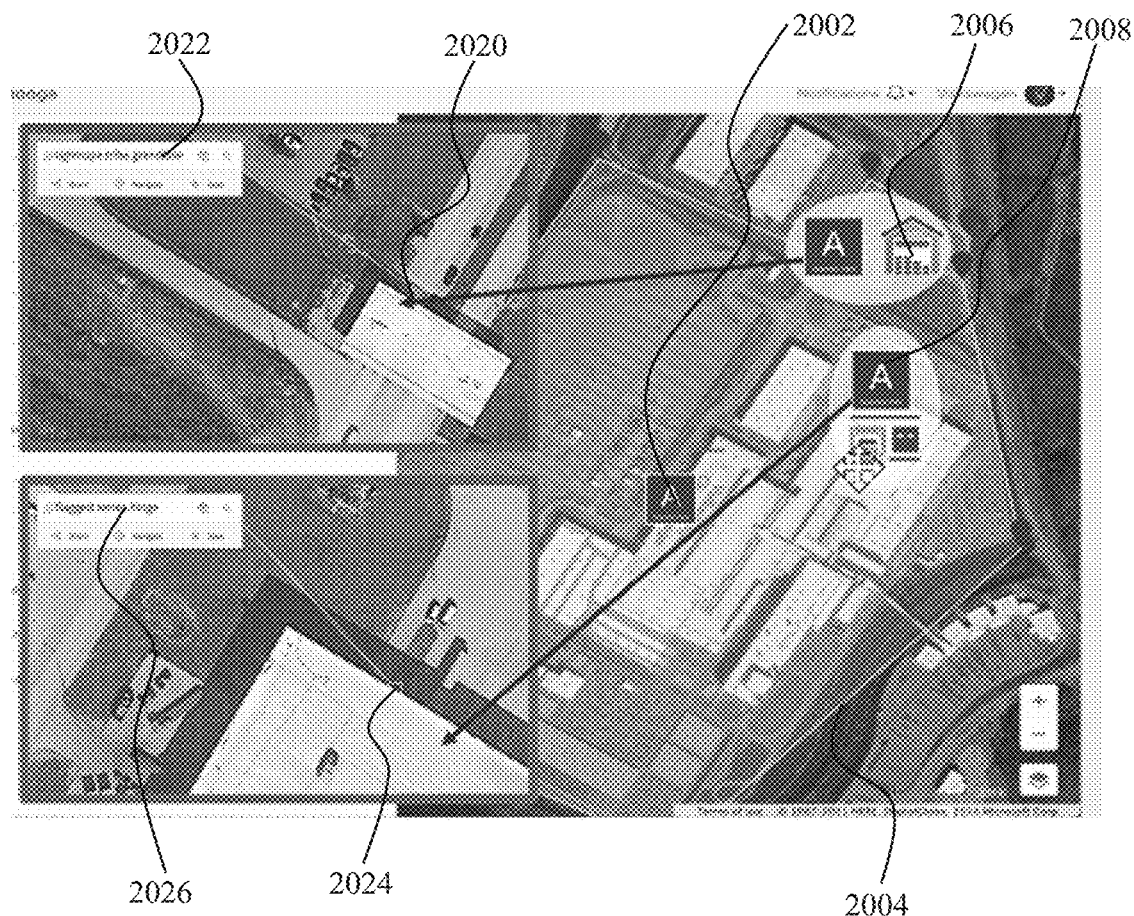
FIG. 20 illustrates a more detailed view of the sub-locations of the LAD of FIG. 19.

For example, referring to FIG. 20, illustrated are additional details regarding the sub-locations 2006 and 2008. As can be shown, the sub-location 2006 relates to a portion of the fixed entity associated with the LAD 2002. More specifically, the sub-location 2006 relates to an entrance gate 2020 that allows for transit entities, such as trucks or other vehicles, access to the manufacturing facility that is associated with the LAD 2002. The precise location of the entrance gate 2020 can be provided using a geolocation 2022. In this case, the geolocation 2022 utilized is in the form of what3words. Here, the entrance gate 2020 location can be identified using the words tightrope.tribe.grandiose as the geolocation 2022. As such, the precise location informing where a particular transit entity should enter the manufacturing facility that is associated with the LAD 2002 can be provided to the driver or the system that controls the movement of the particular transit entity.

Similarly, the sub-location 2008 relates to a portion of the fixed entity associated with the LAD 2002. In this example, the sub-location 2008 relates to a loading dock 2024. Like before, the precise location of the loading dock 2024 can be provided using a geolocation 2026. In this case, the geolocation 2026 utilized is in the form of what3words and is flagged.series.hinge. Again, the precise location of the loading dock 2024 can be provided to the driver of a particular transit entity or system controlling the transit entity.

Of course, it should be understood that the number of sub-locations associated with a particular LAD can be numerous. For example, the manufacturing facility associated with the LAD 2002 may include numerous loading docks, multiple entrance/exit gates, storage yards, parking facilities, and the like. As such, providing the precise location using an easily understandable word-based geolocation format, such as what3words, greatly increases the understandability and usability of specific locations associated with a particular LAD. Furthermore, it may be possible that instead of referring to sub-locations by a name such as "Loading Dock 1," sub-locations may be referred to by their word-based geolocation.

Figure 21:
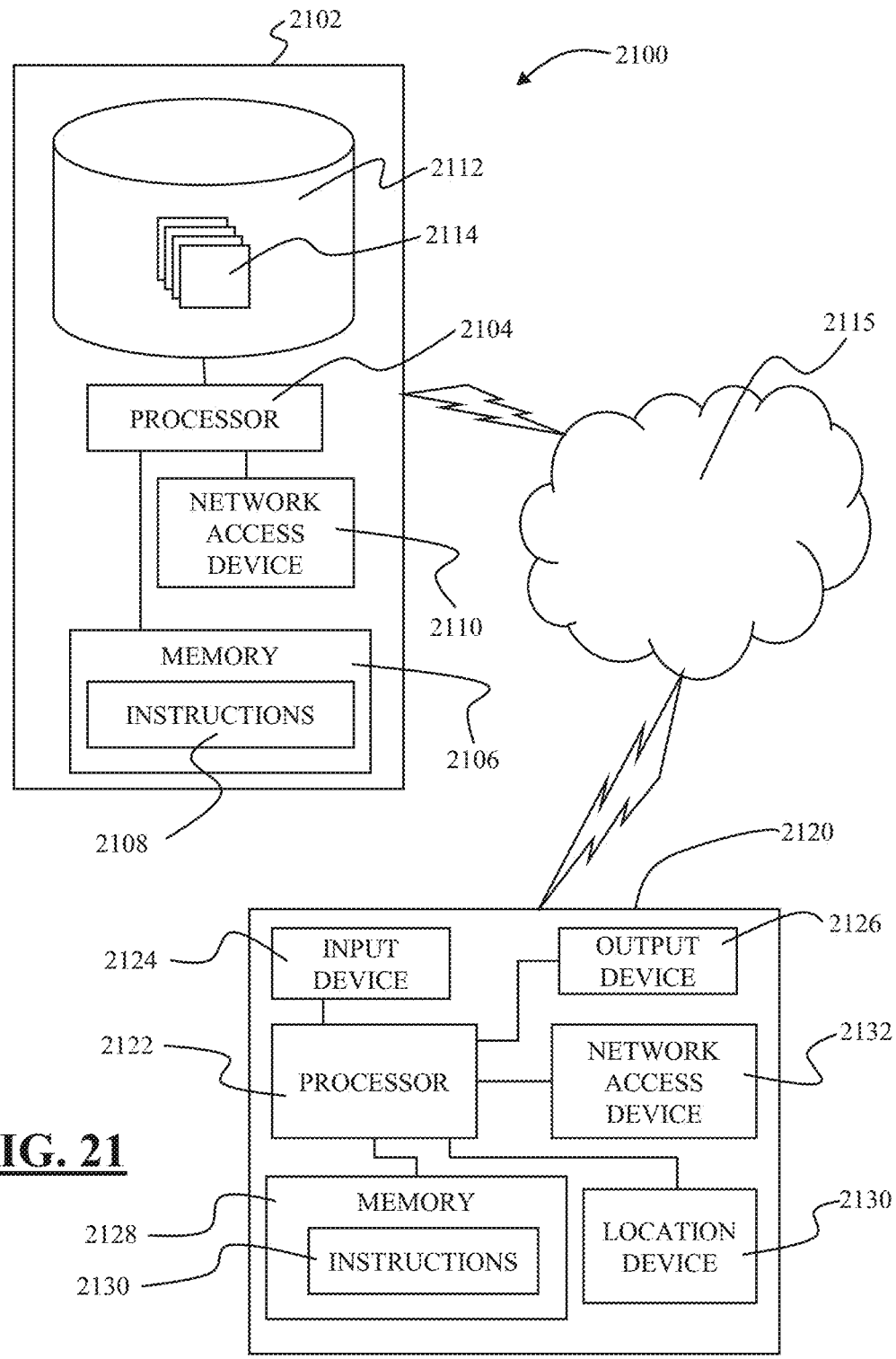
FIG. 21 illustrates a system for retrieving object location information.

Referring to FIG. 21, illustrated as a system 2100 that includes a server 2102 and a user device 2120. The system 2100 can allow users of the user device 2120 to communicate with the server 2102 to update and/or receive the location of objects, conveyances (facilities that are utilized to store and/or objects), transit entities, and/or sensors. More simply, the purpose of the system 2100 is to allow the easy update and/or retrieval of the location of objects, conveyances, transit entities, sensors, and the like.

As to the server 2102, the server 2102 includes a processor 2104 that may be a single processor or multiple processors acting in concert. The processor may be in communication with a memory 2106 that includes instructions 2108 that can configure the processor to perform any one of a number of different functions. The memory 2106 can be any type of memory capable of storing electronic information. As such, the memory 2106 may be a random-access memory, read-only memory, flash memory, magnetic-based storage device, such as a hard disk, optical-based storage device, or any device capable of storing electronic information. Furthermore, the memory 2106 may include one or more devices and may be distributed and located separate and apart from the server 2102. Further still, the memory 2106 may be incorporated within the processor 2104

In addition, the processor 2104 may also be in communication with a storage device 2112 that can store the locations of objects, conveyances, transit entities, sensors, or any movable item within object information 2114. The storage device 2112 may store the object information 2114 in a database capable of updating retrieving the object information 2114. The object information 2114 may include an object identifier for identifying the object and location information associated with the object identifier/object. The storage device 2112 may be incorporated within the memory 2106 or may be separate and apart from the memory 2106. Like the memory 2106, the storage device 2112 may be a random-access memory, read-only memory, flash memory, magnetic-based storage device, such as a hard disk, optical-based storage device, or any device capable of storing electronic information.

A network access device 2110 is in communication with the processor 2104 and allows the server 2102 to communicate to the user device 2120 via a network 2115, such as the Internet. The network access device 2110 may include any one of a number of different hardware components that allow the server 2102 to communicate with other devices and/or networks.

As to the user device 2120, the user device also includes a processor 2122 that may be a single processor or multiple processors acting in concert. Furthermore, the processor 2122 may be in communication with the memory 2128 that includes instructions 2130 that cause the processor 2122 to perform any one of a number of different functions. The memory 2128 may be a random-access memory, read-only memory, flash memory, magnetic-based storage device, such as a hard disk, optical-based storage device, or any device capable of storing electronic information.

The processor 2122 is also in communication with the network access device 2132 that allows the user device 2120 to communicate with the network 2115 and, therefore, the server 2102. The network access device 2132 can include any one of a number of different hardware components that allow the user device 2120 to communicate with the network 2115 and/or the server 2102.

The user device 2120 also includes an input device 2124 and output device 2126 that is in communication with the processor 2122. The input device 2124 can be any type of input device capable of receiving input from a user. As such, the input device 2124 may be a keyboard, touchpad, touchscreen, analog input device, such as a mouse or pointer, and the like. Furthermore, the input device 2124 could include a camera and/or microphone for receiving input visually or audibly. The output device 2126 can be any output device capable of conveying information to a user, such as a display, audio output device, and the like.

Returning attention to the server 2102, the instructions 2108, when executed by the processor 2104 of the server 2102, may cause the processor 2104 to receive a location of an object having an object identifier. In one example, the location may be provided by the user device 2120. Moreover, a user of the user device 2120 may provide a location of an object using the input device 2124. The location may be in the form of a geolocation that can utilize any one of a number of different formats. For example, the location may include a GPS coordinate or other type of coordinate system. Further still, the location may be in the form of a word-based coordinate, such as what3words. As explained previously, word-based coordinate systems, such as what3words, have the advantage in that it is easy for the user to provide input to the input device 2124 using words instead of complex numerics.

From there, the instructions 2108 may cause the processor 2104 to store the location of the object in the storage device 2112, which acts as a remote database. As such, the location may be represented within the object information 2114 and stored within the storage device 2112. The location of the particular object may also be associated with an object identifier. The object identifier can be utilized to identify which particular object location should be associated with. The location may be stored in any type of format, such as GPS coordinates, word-based coordinates, such as what3words, and the like. In one example, the processor 2104 may convert a coordinate received from the user device 2120 to a word-based format and vice versa.

The instructions 2108, in addition to causing the processor 2104 to receive and store locations of objects, can also cause the processor 2104 to provide stored object information 2114 to the user device 2120. In particular, the user of the user device 2120 may want to know the location of a particular object. As explained previously, objects can include a number of different items, such as parts, conveyances, transit entities, and the like. As such, the instructions 2108 may cause the processor 2104 to receive from the user device 2120 an object location request that includes an object identifier that identifies the object.

Upon receiving the request, the instructions 2108 may cause the processor 2104 to then determine the location of the object associated with the object identifier and transmit the location of the object to the user device 2120. From there, the user device 2120 may display the location to the user via the output device 2126. The display of the location may be in a word-based format, such as what3words. In some cases, the location may be transmitted in the word-based format from the server 2102 or may be converted by the user device 2120 from a coordinate type system to a word-based type format.

Focusing on the user device 2120, the user device 2120 can take any one of a number of different forms, such as a tablet, desktop computer, mobile device, and the like. The instructions 2130 may cause the processor 2122 to receive an object identifier identifying an object as well as a location of the object. The object identifier and/or the location of the object may be provided by the input device 2124 or may be automatically generated using a GPS function. For example, the user of the user device 2120 may be able to scan an object using the input device, which, as explained previously, could be a camera. The scanning of the object may include scanning a barcode that is attached to the object, object packaging, or conveyance holding the object. The scanning essentially provides the identifier for the object.

The location of the object may be generated using a GPS device 2134 that may be in communication with the processor 2122. Moreover, because the user device 2120 may be located near the object of interest, the GPS location generated by the user device 2120 may be associated with the object and used as the object location. Information from the GPS device 2134 can then be provided along with the object identifier to the server 2102, where it can be stored as object information 2114. Information from the GPS device 2134 may be converted by the processor 2122 into a different format, such as what3words. As such, the user device 2120 can be utilized to rapidly identify and provide location information for objects and the like.

It should be appreciated that any of the systems described in this specification can be configured in various arrangements with separate integrated circuits and/or chips. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a graphics processing unit (GPU), a CD, other optical medium, a RAM, a ROM, a memory chip or card, a memory stick, and other media from which a computer, a processor or other electronic device can read. In the context of this document, a computer-readable storage medium may be any tangible medium that can contain or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that, when executed, perform an algorithm, and so on. A module, in one or more embodiments, may include one or more CMOS gates, combinations of gates, or other circuit components. Where multiple modules are described, one or more embodiments may include incorporating the multiple modules into one physical module component. Similarly, where a single module is described, one or more embodiments distribute the single module between multiple physical components.

Additionally, module, as used herein, includes routines, programs, objects, components, data structures, and so on that perform tasks or implement data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present specification is implemented as an application-specific integrated circuit (ASIC), a hardware component of a system on a chip (SoC), as a programmable logic array (PLA), as a graphics processing unit (GPU), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another." as used herein, is defined as at least a second or more. The terms "including" and/or "having." as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system utilizing a canonical model for monitoring fixed entities and transit entities, the system comprising:
   a circuit including one or more data collectors, the circuit configured to:
     receive information from a user interface operating on a remote computing device via a computer network,
     provide information to the user interface operating on the remote computing device via the computer network, and
     receive transmitted information from the transit entities;
   a configuration database in communication with the circuit, the configuration database comprising location asset designators and modal asset designators that form the canonical model; wherein at least one of the location asset designators has a data structure that includes a fixed entity type and a fixed entity location of at least one fixed entity in the real world, the fixed entity location represented in a word-based format that indicates a geographic location of the at least one of the location asset designators, wherein the geographic location identified by the word-based format is an area of a plurality of predefined areas of at least part of the Earth;
   wherein at least one of the modal asset designators has a data structure that includes a transit identity and a transit location indicating a geographic location of the at least one of the transit entities in the real world; and
   wherein the circuit is configured to periodically receive transit locations and transit identities from the transit entities and update the modal asset designators of the canonical model associated with the transit locations from the transit entities.

2. The system of claim 1, wherein the word-based format includes at least three dictionary words.

3. The system of claim 1, wherein the at least one of the location asset designators further comprises sub-location information represented in the word-based format that indicates one or more sub-locations associated the at least one of the location asset designators.

4. The system of claim 1, wherein the fixed entity location of the at least one of the location asset designators further comprises a geo-fenced location.

5. The system of claim 4, wherein the one or more sub-locations are located within the geofenced location.

6. The system of claim 1, wherein the configuration database includes a last stop location of at least one of the transit entities associated with the at least one of the modal asset designators, wherein the last stop location is in the word-based format.

7. A system utilizing a canonical model for monitoring fixed entities and moveable objects, the system comprising:
   a circuit including one or more data collectors, the circuit configured to:
     receive information from a user interface operating on a remote computing device via a computer network,
     provide information to the user interface operating on the remote computing device via the computer network, and
     receive transmitted information from sensors associated with the moveable objects;
   a configuration database in communication with the circuit, the configuration database comprising location asset designators and sensor asset designators that form the canonical model;
   wherein at least one of the location asset designators has a data structure that includes a fixed entity type and a fixed entity location of at least one fixed entity in the real world, the fixed entity location represented in a word-based format that indicates a geographic location of the at least one of the location asset designators, wherein the geographic location identified by the word-based format is an area of a plurality of predefined areas of at least part of the Earth;
   wherein at least one of the sensor asset designators has a data structure that includes a sensor identity of the sensor associated with at least one of the moveable objects and a sensor location of the sensor in the real world; and
   wherein the circuit is configured to periodically receive sensor locations and sensor identities from the sensors and update the sensor asset designators of the canonical model with the sensor locations of the sensor from the moveable objects.

8. The system of claim 7, wherein the word-based format includes at least three dictionary words.

9. The system of claim 7, wherein the at least one of the location asset designators further comprises sub-location information represented in the word-based format that indicates one or more sub-locations associated with the at least one of the location asset designators.

10. The system of claim 7, wherein the fixed entity location of at least one of the location asset designators further comprises a geo-fenced location.

11. The system of claim 10, wherein the one or more sub-locations are located within the geofenced location.

12. The system of claim 7, wherein the configuration database includes a last stop location of at least one moveable object associated with the at least one of the sensor asset designators, wherein the last stop location is in the word-based format.

13. A method for monitoring fixed entities and transit entities utilizing a canonical model having location asset designators and modal asset designators, wherein at least one of the location asset designators has a data structure that includes a fixed entity type and a fixed entity location of at least one fixed entity in the real world represented in a word-based format, wherein the fixed entity location identified by the word-based format is an area of a plurality of predefined areas of at least part of the Earth, wherein at least one of the modal asset designators has a data structure that includes a transit identity and a transit location in the real world of at least one of the transit entities, the method comprising the steps of:
receiving transit locations and transit identities from the transit entities;
updating the modal asset designators of the canonical model with the transit locations of the transit entities from the transit entities; and
determining when at least one of the transit entities has reached the fixed entity location by comparing the transit location of at least one of the modal asset designators to the fixed entity location of at least one of the location asset designators of the canonical model.

14. The method of claim 13, wherein the word-based format includes at least three dictionary words.

15. The method of claim 13, wherein the at least one of the location asset designators further comprises sub-location information represented in the word-based format that indicates one or more sub-locations associated with the at least one of the location asset designators.

16. The method of claim 15, wherein the fixed entity location of the location asset designators is a geo-fenced location.

17. The method of claim 13, further comprising the steps of:
determining a last stop location of at least one of the transit entities associated with the at least one of the modal asset designators, wherein the last stop location is in the word-based format; and
updating a configuration database to include the last stop location of at least one of the transit entities associated with the at least one of the modal asset designators.

18. The method of claim 13, further comprising the steps of:
generating a map data structure illustrating locations of the location asset designators based on the fixed entity location and locations of the modal asset designators based on the transit locations, and
generating a route on the map data structure to be taken by at least one of the transit entities associated with the at least one of the modal asset designators to one or more sub-locations associated the at least one of the location asset designators.

19. A method for monitoring fixed entities and moveable objects utilizing a canonical model having location asset designators and sensor asset designators, wherein at least one of the location asset designators has a data structure that includes a fixed entity type and a fixed entity location of at least one fixed entity in the real world represented in a word-based format, wherein the fixed entity location identified by the word-based format is an area of a plurality of predefined areas of at least part of the Earth, wherein at least one of the sensor asset designators has a data structure that includes a sensor identity of a sensor and a sensor location in the real world of the sensor of that is associated with at least one of the moveable objects, the method comprising the steps of:
receiving sensor locations and sensor identities from the sensor;
updating the sensor asset designators of the canonical model with the sensor locations of the sensor from the moveable objects; and
determining when at least one of the moveable objects has reached the fixed entity location by comparing the sensor location of at least one of the sensor asset designators to the fixed entity location of at least one of the location asset designators of the canonical model.

20. The method of claim 19, wherein the word-based format includes at least three dictionary words.

21. The method of claim 19, wherein the at least one of the location asset designators further comprises sub-location information represented in the word-based format that indicates one or more sub-locations associated with the at least one of the location asset designators.

22. The method of claim 21, wherein the fixed entity location of the location asset designators is a geo-fenced location.

23. The method of claim 21, further comprising the steps of:
determining a last known location of at least one of the moveable objects associated with the at least one of the sensor asset designators, wherein the last known location is in the word-based format; and
updating a configuration database to include the last known location of at least one of the moveable objects associated with the at least one of the sensor asset designators.

24. A method for retrieving object location information comprising steps of:
receiving a location of an object having an object identifier;
storing the location of the object on a remote database;
receiving from a remote device an object location request that includes the object identifier;
determining the location of the object stored within the database using the object identifier located within the object location request;
transmitting the location of the object to the remote device; and
displaying the location of the object on the remote device in a word-based format, wherein the location identified by the word-based format is an area of a plurality of predefined areas of at least part of the Earth.

25. The method of claim 24, further comprising converting the location of the object from a first format to the word-based format.

26. The method of claim 25, wherein the first format is a geographic coordinate system format.

27. The method of claim 24, wherein the location of the object is associated with a location asset designator that is part of a canonical model, wherein the location asset designator has a data structure that includes a fixed entity type and a fixed entity location of a fixed entity in the real world represented in a word-based format.

28. A system for retrieving object location information comprising:
- a processor;
- a storage device in communication with the processor; and
- a memory in communication with the processor, the memory having instructions that, when executed by the processor, cause the processor to:
    - determine a location of an object having an object identifier,
    - store the location of the object on a remote database,
    - receive from a remote device an object location request that includes the object identifier,
    - determine the location of the object stored within the database using the object identifier located within the object location request,
    - transmit the location of the object to the remote device, and
    - display the location of the object on the remote device in a word-based format, wherein the location identified by the word-based format is an area of a plurality of predefined areas of at least part of the Earth.

29. The system of claim 28, wherein the memory further includes instructions that, when executed by the processor, cause the processor to convert the location of the object from a first format to the word-based format.

30. The system of claim 29, wherein the first format is a geographic coordinate system format.

31. The system of claim 28, wherein the location of the object is associated with a location asset designator that is part of a canonical model, wherein the location asset designator has a data structure that includes a fixed entity type and a fixed entity location of a fixed entity in the real world represented in a word-based format.

* * * * *